United States Patent
Arai et al.

(10) Patent No.: US 7,328,507 B2
(45) Date of Patent: *Feb. 12, 2008

(54) SIMULTANEOUS FORMING METHOD OF THROTTLE BODY AND THROTTLE VALVE

(75) Inventors: Tsuyoshi Arai, Kariya (JP); Naoki Hiraiwa, Toyokawa (JP); Katsuya Torii, Anjo (JP)

(73) Assignee: Denso Corporation (JP)

( * ) Notice: Subject to any disclaimer, the term of this patent is extended or adjusted under 35 U.S.C. 154(b) by 506 days.

This patent is subject to a terminal disclaimer.

(21) Appl. No.: 10/901,085

(22) Filed: Jul. 29, 2004

(65) Prior Publication Data

US 2005/0022365 A1    Feb. 3, 2005

(30) Foreign Application Priority Data

Aug. 1, 2003    (JP)    ............... 2003-285457

(51) Int. Cl.
 B21K 1/22    (2006.01)
 B21K 1/20    (2006.01)
 B29C 45/00    (2006.01)
(52) U.S. Cl. ............... 29/888.4; 29/888.45; 29/888.46; 29/527.1; 264/242; 264/328.8
(58) Field of Classification Search ............... 29/888.4, 29/888.45, 888.46, 527.1; 264/242, 328.7, 264/328.8, 328.18, 334, 275
See application file for complete search history.

(56) References Cited

U.S. PATENT DOCUMENTS 5,304,336 A    4/1994    Karlsson

| 6,408,817 | B2 | 6/2002 | Torii et al. |
| 6,488,871 | B2 * | 12/2002 | Nomura et al. ................. 264/6 |
| 6,701,892 | B2 | 3/2004 | Wayama et al. |
| 6,903,148 | B2 * | 6/2005 | Suzuki et al. ............... 523/216 |
| 7,069,902 | B2 * | 7/2006 | Arai et al. .................. 123/337 |

(Continued)

FOREIGN PATENT DOCUMENTS

DE    101 05 526 A1 *    8/2002

(Continued)

OTHER PUBLICATIONS

CN Examination Report dated Feb. 12, 2007.

(Continued)

*Primary Examiner*—David P. Bryant
*Assistant Examiner*—Sarang Afzali
(74) *Attorney, Agent, or Firm*—Nixon & Vanderhye PC

(57) ABSTRACT

An electrically controlled throttle apparatus is constructed with a throttle body and a throttle valve that are simultaneously molded of a resinous material in the same molding dies. The throttle valve is rotatably assembled in a bore wall part of the throttle body while the throttle valve is rotated by a predetermined rotation angle θ between 45° and 135° with respect to a rotation angle 0° corresponding to its full close position. An outer circumferential periphery of the filler, which is molded to be the throttle valve in a cavity of the molding dies, is compressed by a predetermined pressure when the throttle valve and the throttle body are molded. Thus, dispersion of contraction of the throttle valve can be reduced in its molding process by adding the compression process.

23 Claims, 17 Drawing Sheets

U.S. PATENT DOCUMENTS

| | | |
|---|---|---|
| 7,089,663 B2 * | 8/2006 | Arai et al. ............... 29/888.4 |
| 7,093,581 B2 | 8/2006 | Wayama et al. |
| 7,107,678 B2 * | 9/2006 | Arai et al. ............... 29/888.4 |
| 7,107,679 B2 * | 9/2006 | Arai et al. ............... 29/888.4 |
| 7,107,683 B2 * | 9/2006 | Arai et al. ............... 29/888.4 |
| 7,152,581 B2 | 12/2006 | Wayama et al. |
| 2006/0272615 A1 | 12/2006 | Wayama et al. |
| 2007/0012288 A1 | 1/2007 | Wayama et al. |

FOREIGN PATENT DOCUMENTS

| | | |
|---|---|---|
| JP | A-5-141540 | 6/1993 |
| JP | B2-3315135 | 6/1993 |
| JP | 10-047520 | 2/1998 |
| JP | 10-169474 | 6/1998 |
| JP | 2000-190335 | 7/2000 |
| JP | 2000-210984 | 8/2000 |
| JP | 2002-138860 | 5/2002 |
| JP | 2003-013751 | 1/2003 |

OTHER PUBLICATIONS

Japanese Office Action dated Sep. 4, 2007 and mailed Sep. 7, 2007 issued in corresponding JP Application No. 2003-285457.

* cited by examiner

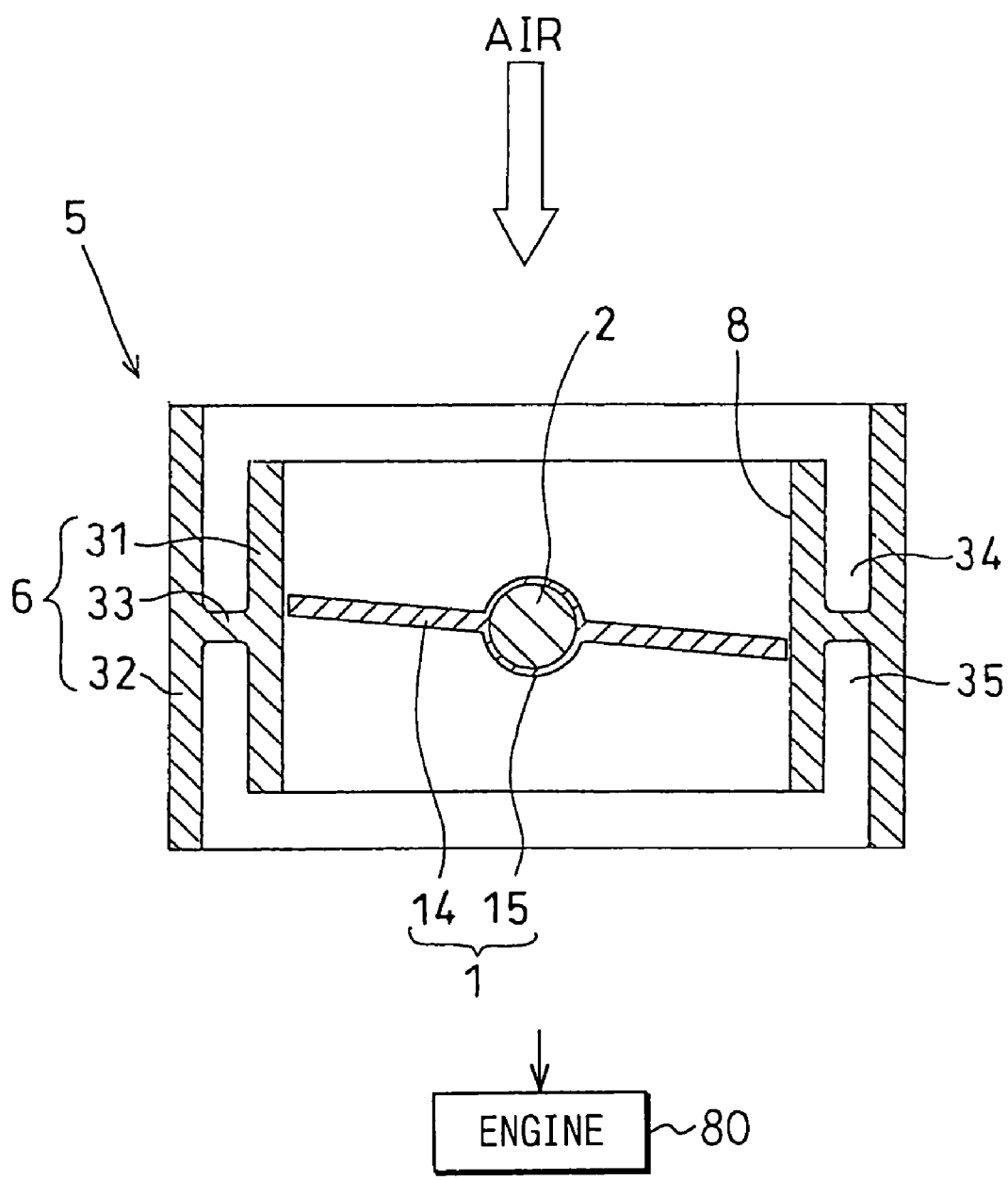

SIMULTANEOUS FORMING METHOD OF THROTTLE BODY AND THROTTLE VALVE

CROSS REFERENCE TO RELATED APPLICATION

This application is based on and incorporates herein by reference Japanese Patent Application No. 2003-285457 filed on Aug. 1, 2003.

FIELD OF THE INVENTION

The present invention relates to a forming method of a throttle body used for an internal combustion engine mounted in a vehicle. Especially, the present invention relates to a forming method of a throttle body, in which a throttle valve and a throttle body are substantially simultaneously formed in the same die by molding or casting.

BACKGROUND OF THE INVENTION

In an electrically controlled throttle apparatus as shown in FIG. 16, a driving device such as a motor controls an opening degree of a throttle valve 102 in accordance with an accelerator position of an accelerator pedal stepped by a driver. In the throttle apparatus, a gap is formed between a bore inner periphery of a substantially tubular throttle body 101 and an outer circumferential periphery of a throttle valve 102, and the gap has a large influence of an airtightness of the throttle apparatus when the throttle valve 102 is in its full close position.

Conventionally, the throttle body 101 and the throttle valve 102 are independently manufactured in each different processes. Subsequently, a manufactured throttle valve 102 is combined with a manufactured throttle body 101 in accordance with an inner peripheral dimension of the manufactured throttle body 101 in a downstream process. Alternatively, a manufactured throttle body 101 is combined with a manufactured throttle valve 102 in accordance with an outer circumferential dimension of the throttle valve 102 in a downstream process. Thus, a predetermined gap is obtained between the bore inner periphery of the throttle body 101 and the outer circumferential periphery of a throttle valve 102. A throttle shaft 103 integrally rotates with the throttle valve 102. Both of the ends of the throttle shaft 103 are rotatably supported by cylindrical valve bearings 104 provided in the throttle body 101.

In molding methods according to JP-A-5-141540 and JP-B2-3315135, a manufacturing process of a throttle apparatus is reduced, and dimensional accuracy of a gap formed between a throttle valve and a throttle body is enhanced in a throttle apparatus of an engine. In the molding methods, the throttle body 101 and the throttle valve 102 shown in FIG. 17 are integrally molded of a resinous material in the same molding dies. At first the substantially tubular throttle body 101 is integrally molded of a resinous material. Subsequently, inner periphery (bore inner periphery) of the throttle body 101 is used as a molding die molding the throttle valve 102 when the throttle valve 102 is molded. Thus, a shape of an outer circumferential periphery of the throttle valve 102 is adapted to a shape of the bore inner periphery of the throttle body 101 in the above molding methods.

However, in the above molding methods of the throttle valve 102, the throttle body 101 is molded of a resinous material while the molded throttle body 101 is restricted by dies in its radial direction and in its substantially circumferential direction. Thus, the throttle valve 102 is molded of a resinous material while the throttle body 101 and the throttle valve 102 are restricted by the dies. The throttle body 101 and the throttle valve 102 are taken out of the dies, and gradually cooled. In this cooling period, the unrestricted throttle body 101 and the throttle valve 102 contracts. Namely, the throttle body 101 and the throttle valve 102 are deformed. Accordingly, the gap, which is formed between the bore inner periphery of the throttle body 101 and the outer circumferential periphery of the throttle valve 102, is deformed, and it is difficult to maintain the gap to be in a predetermined dimension.

To solve the above problem, according to an example 1 shown in FIG. 18, a throttle valve 1 is molded in a throttle body 5 as the throttle valve 1 is set to be in an opening position excluding its full close position. In FIG. 18, the rotation angle of the throttle valve 1 is set to be substantially perpendicular with respect to the full close position of the throttle valve 1. Thus, the outer circumferential periphery of the throttle valve 1 and the bore inner periphery 8 of a bore inner pipe 31 of a bore wall part 6 of a throttle body 5 are partitioned by dies. Here, a connecting part 105 connects the outer wall 6a of the bore wall part 6 of the throttle body 5 and the outer wall 7a of the motor housing part 7. In this structure, the outer circumferential periphery of the throttle valve 1 and the bore inner periphery 8 of a bore inner pipe 31 can be molded in the same dies in consideration of contraction (molding contraction, molding shrinkage) occurring in a molding process and deformation occurring in practical use. However, it is difficult to reduce dispersion of molding contraction. Here, dispersion of molding contraction occurring in the rotation axis (Y-axis direction) of the throttle valve 1 can be reduced by insert molding a throttle shaft (axial reinforce member, metallic shaft) 2 formed of a metallic material inside of a cylindrical part (resinous shaft part) 15 of the throttle valve 1. However, molding contraction occurring in a direction (radial direction, Z-axis direction) perpendicular to the rotation axis (Y-axis direction) of the throttle valve 1 cannot be reduced in its molding process. Accordingly, dispersion of a radial dimension of a disc part (resinous disc part) 14 of the throttle valve 1 increases due to contraction occurring in its molding process.

SUMMARY OF THE INVENTION

It is an object of the present invention to propose a forming method, in which a throttle valve is simultaneously formed with a throttle body using the same forming dies, and is internally assembled to the throttle body in a throttle apparatus used for an internal combustion engine. Specifically, the throttle valve is formed in the throttle body when the throttle valve is in a position, in which the throttle valve is inclined from its full close position by a predetermined angle. That is, the throttle valve is formed in the throttle body when the throttle valve is in a position excluding its full close position. Here, when the throttle valve is in its full close position, a gap formed between the throttle valve and the throttle body becomes a predetermined minimum gap. Thus, the gap formed between the bore inner periphery of the throttle body and the outer circumferential periphery of the throttle valve can be maintained at a predetermined dimension using the forming die.

It is another object of the present invention to propose a forming method, in which at least filler filled in a cavity forming an outer circumferential periphery of the throttle valve is compressed. Thus, dispersion of contraction occurring in a radial direction of the throttle valve that is substantially perpendicular to the rotation axis of the throttle valve can be reduced in its forming process.

According to the present invention, a throttle apparatus, which is provided in an internal combustion engine, includes a substantially tubular throttle body and a substantially disc-shaped throttle valve having a rotation center substantially perpendicular to a central axis of the throttle body. A substantially simultaneous forming method of the throttle apparatus, which uses the same dies, includes a filling process and a compressing process. In the filling process, filler, which is heated to be in a molten state, is filled into a cavity of the dies to form the throttle body and the throttle valve. The throttle body rotatably receives the throttle valve that is rotated by a predetermined angle with respect to a full close position of the throttle valve. In the compressing process, the filler in the cavity of the dies is compressed by a predetermined pressure. Filler, which is formed to be an outer circumferential periphery of the throttle valve, is compressed in the cavity of the dies in the compressing process. The outer circumferential periphery of the throttle valve compressed in the cavity of the dies is located on an end side in a radial direction of the throttle valve. The radial direction of the throttle valve is substantially perpendicular to the rotation center of the throttle valve.

In a pressure holding process, which follows the filling process, predetermined pressure applied to the filler in the cavity of the dies is held (maintained), and the filler is cooled. Filler in a molten state is refilled into the cavity of the dies by an amount, which is equivalent to a reduced volume of the cooled filler contracted by the cooling, in the pressure holding process. The compressing process is included in at least one of the filling process and the pressure holding process. A gap formed between the throttle valve and the throttle body becomes minimum when the throttle valve is in its full close position of the throttle valve. Intake air introduced into the internal combustion engine flows through the throttle body along the central axial direction of the throttle body. The throttle body and the throttle valve are integrally formed using one of resin molding and metal casting.

BRIEF DESCRIPTION OF THE DRAWINGS

The above and other objects, features and advantages of the present invention will become more apparent from the following detailed description made with reference to the accompanying drawings. In the drawings:

FIG. 3 is a schematic cross-sectional side view showing a double-pipe structure of a bore wall part provided in the throttle body;

DETAILED DESCRIPTION OF PREFERRED EMBODIMENTS

First Embodiment

Figure 1:
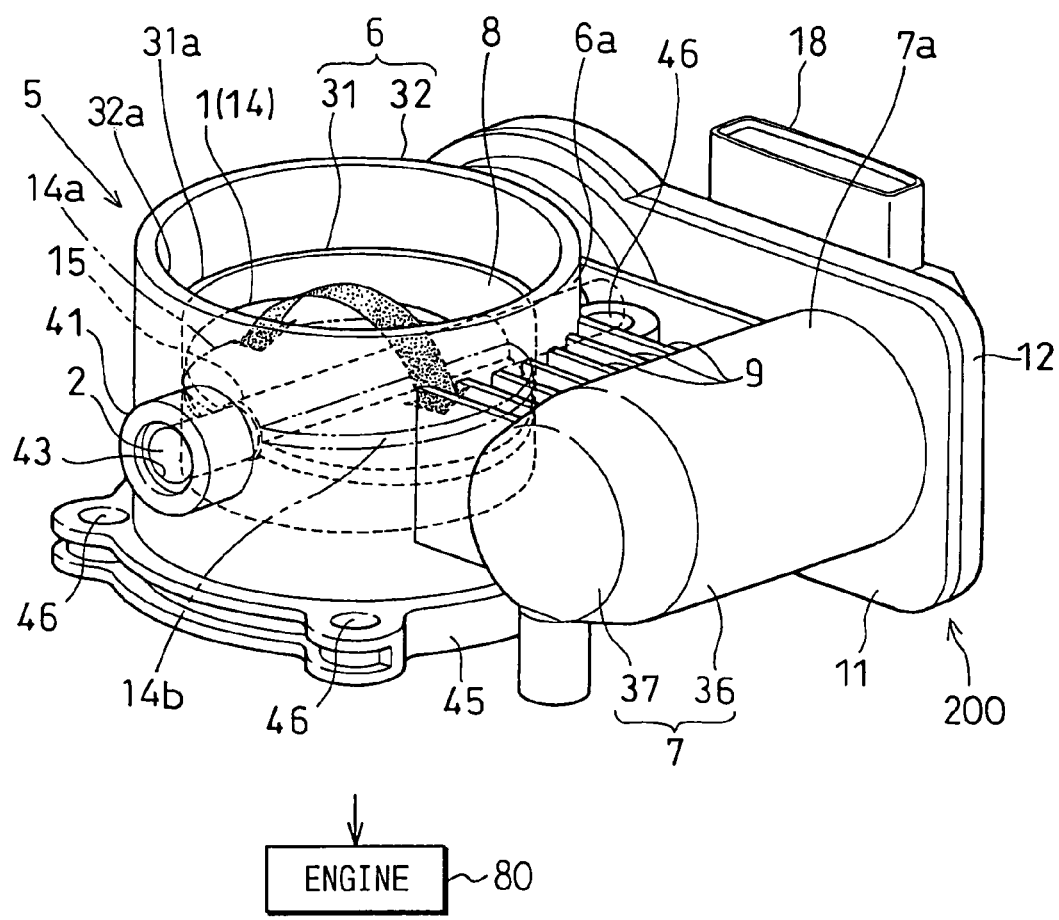
FIG. 1 is a perspective view showing an electrically controlled throttle apparatus according to a first embodiment of the present invention.
Figure 2:
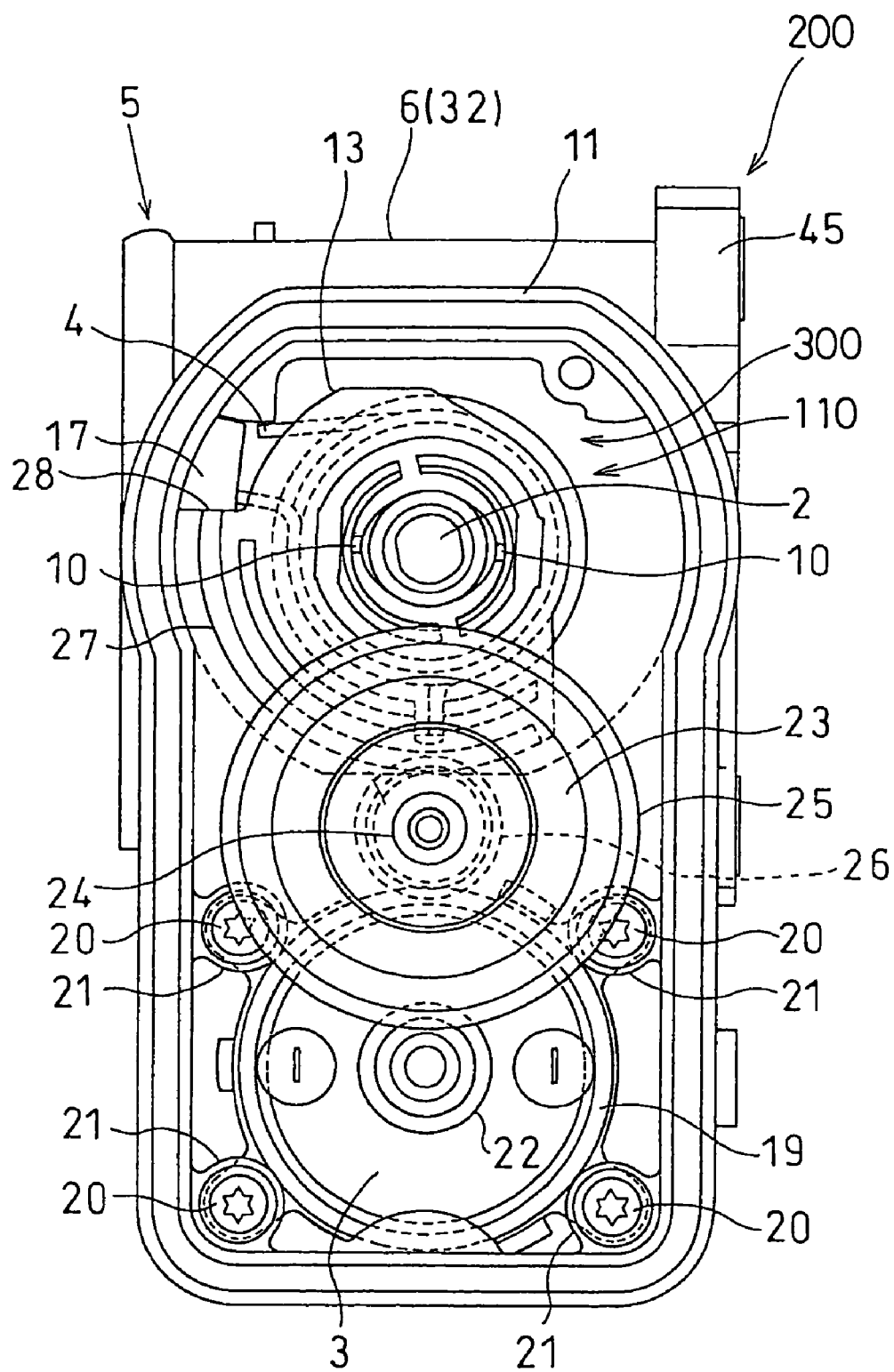
FIG. 2 is a front view showing components received in a gearbox of a throttle body provided in the electrically controlled throttle apparatus.

As shown in FIGS. 1 to 3, an electrically controlled throttle apparatus is constructed with a throttle valve 1, a throttle shaft 2, a driving motor 3, a coil spring 4, reduction gears 300, an actuator case 200, a throttle body 5 and an ECU (electronic control unit). The throttle valve 1 controls an amount of intake air flowing into an internal combustion engine 80. The throttle shaft 2 constructs a shaft part of the throttle valve 1. The driving motor 3 rotates the throttle shaft 2, so that the throttle valve 1 is rotated in an open direction, in which the throttle valve 1 is opened to be in a full throttle position (full open position), or a close direction, in which the throttle valve 1 is closed to be in an idling position (full close position). The driving motor 3 serves as an actuator (valve operating means). The coil spring 4 urges the throttle shaft 2, so that the throttle valve 1 is rotated in the close direction. The reduction gears (power transmission unit) 300 transmit rotation power of the driving motor 3 to the throttle shaft 2 in order to integrally rotate the throttle shaft 2 and the throttle valve 1. The actuator case 200 rotatably receives the reduction gears 300. The throttle body 5 internally forms an air intake passage introducing intake air into each cylinders of the engine 80. The ECU (electronic control unit) electrically controls the driving motor 3. The ECU is connected to an accelerator position sensor (not shown) that converts an operation degree (accelerator operation amount) of an accelerator pedal stepped by a driver into an electronic signal (accelerator position signal) in order to output the accelerator position signal to the ECU.

The accelerator position signal represents the accelerator operation amount. The electrically controlled throttle apparatus has a throttle position sensor 110 that converts an opening degree of the throttle valve 1 into an electronic signal (throttle position signal) in order to output the throttle position signal to the ECU. The throttle position signal represents an opening degree of the throttle valve 1. The ECU performs PID (proportional, integral and differential [derivative]) feedback control with respect to the driving motor 3 in order to eliminate deviation between the throttle position signal transmitted from the throttle position sensor 110 and the accelerator position signal transmitted from the accelerator position sensor.

The throttle position sensor 110 is constructed with permanent magnets 10, yokes (not shown), a hall element (not shown), a terminal (not shown), a stator (not shown) and the like. The permanent magnets 10 are separated rectangular magnets used for generating a magnetic field. The yokes are constructed with separated substantially arc-shaped pieces, and are magnetized by the permanent magnets 10. The hall element is integrally provided with a sensor cover 12 to be opposed to the separated permanent magnets 10. The terminal is constructed with a conductive metallic thin plate that connects the hall element to the ECU, which is externally provided with respect to the throttle position sensor 110. The stator is made of a ferrous metallic material for concentrating magnetic flux into the hall element. The separated permanent magnets 10 and the separated yokes are secured to the inner periphery of a valve gear 13, which constructs the reduction gears 300, using glue or the like.

The throttle valve 1 is a butterfly-type rotary valve (resinous valve) for controlling an amount of intake air introduced into the engine 80. In this embodiment, the throttle valve 1 having a substantially disc shape is integrally molded with the outer periphery of a valve supporting portion of the throttle shaft 2, so that the throttle valve 1 and the throttle shaft 2 can integrally rotate. The throttle valve 1 is made of a thermo stable resinous material, such as PPS (poly phenylene sulfide), PBTG30 (poly butylene terephthalate including grass fiber by 30%), PA (polyamide), PP (polypropylene) or PEI (polyether imide).

In this embodiment, the throttle valve 1 is constructed with a substantially disc-shaped resinous disc part (disc-shaped part) 14, a substantially cylindrical resinous shaft part (cylindrical part) 15 and the like. A stiffening rib (not shown) is integrally molded on one plane face, e.g., upstream side of the intake airflow direction with respect to the resinous disc part 14, or both plane faces of the disc-shaped part 14 of the throttle valve 1 for reinforcing the disc-shaped part 14. The resinous shaft part 15 is molded of the same resinous material as that of the resinous disc part 14 to be in a substantially cylindrical shape. Both of the axial ends of the resinous shaft part 15 are arranged to be in the substantially same plane as a plane including both ends of the rotation axis of the resinous throttle valve 1, i.e., both circumferential ends around the rotation axis of the throttle valve 1.

The throttle shaft 2 is a metallic shaft (axial reinforce member), which serves as a reinforcing member, formed of a metallic material such as brass or stainless steel to be in a round-bar shape, for example. The axis of the throttle shaft 2 is arranged to be in a direction substantially perpendicular to a central axis of the bore wall part 6 of the throttle body 5, and is arranged to be in a direction substantially parallel to the central axis of a motor housing part 7. In this embodiment, the throttle shaft 2 has a metallic valve supporting portion for supporting the resinous shaft part 15 of the throttle valve 1. The metallic valve supporting portion is insert molded inside of the resinous shaft part 15 to reinforce the resinous disc part 14 and the resinous shaft part 15 of the throttle valve 1.

One end portion of the throttle shaft 2 on the left side end in FIG. 1 exposes (protrudes) from one end face of the resinous shaft part 15 of the throttle valve 1 in order to serve as a first bearing sliding part that rotatably slides with respect to the first valve bearing 41 of the bore wall part 6 of the throttle body 5. The other end side of the throttle shaft 2 on the right side end in FIG. 1 exposes (protrudes) from the other end face of the resinous shaft part 15 of the throttle valve 1 in order to serve as a second bearing sliding part (not shown) that rotatably slides with respect to a second valve bearing (not shown) of the bore wall part 6 of the throttle body 5. The valve gear 13 constructing the reduction gears 300 is integrally provided on the other end portion of the throttle shaft 2 on the right side end in FIG. 1.

The actuator case 200 is constructed with a gearbox part (gear housing part, case body) 11 and a sensor cover (gear cover, cover) 12. The gearbox part 11 is integrally molded of the resinous material with an outer periphery of the bore wall part 6 of the throttle body 5. The sensor cover 12 supports the hall element of the throttle position sensor 110, the terminal and the stator. The sensor cover 12 covers the opening side of the gearbox part 11.

The gearbox part 11 is made of the same resinous material as that of the bore wall part 6, and is molded in a predetermined shape to construct a gear chamber that rotatably receives the reduction gears 300. A full-close stopper 17 is integrally molded with the inner wall of the gearbox part 11 of the resinous material, for restricting rotation of the throttle valve 1 at the idling position, i.e., full close position of the throttle valve 1. Here, a full-open stopper may be integrally molded with the inner wall of the gearbox part 11 for restricting rotation of the throttle valve 1 at the full-throttle position, i.e., full open position of the throttle valve 1.

The sensor cover 12 is formed of a resinous material such as thermo plastic in a predetermined shape, in order to electrically insulate between terminals of the throttle position sensor 110 and power-supply terminals of the driving motor 3. The sensor cover 12 has an engaging part that engages with a corresponding engaged part, which is formed on the opening side of the gearbox part 11 of the throttle body 5, each other. The engaging part of the sensor cover 12 and the engaged part of the gearbox part 11 are connected using a rivet, a screw (not shown), or are thermally swaged with each other, for example. A substantially cylindrical shaped receptacle 18 is integrally molded with the sensor cover 12 to be connected with an electrical connector (not shown).

The driving motor 3 is an electrically driven actuator integrally connected with the power-supply terminals that is provided in the sensor cover 12 or the substantially cylindrical shaped motor housing part 7. When the driving motor 3 is energized, its motor shaft (not shown) is rotated in its forward direction or in its reverse direction. The driving motor 3 has a front-end frame 19 screwed onto a protrusion 21 that is provided in the motor housing part 7 or the gearbox part 11 using a fastening member 20 such as a screw. Thus, the driving motor 3 is received in the motor housing part 7. A cushion member such as a blade spring can be provided between a rear-end frame of the driving motor 3 and a bottom wall surface of the motor housing part 7 in order to insulate the driving motor 3 from vibration of the engine 80. Another cushion member can be provided between an end yoke (not shown) of the driving motor 3 and a bottom wall surface of the motor housing part 7. Alternatively, an insulation member can be provided instead of the cushion member for enhancing vibration resistant performance of the driving motor 3.

The reduction gears 300 reduce rotation speed of the driving motor 3 by a predetermined reduction gear ratio. The reduction gears 300 (valve driving means, power transmission unit) is constructed with a pinion gear 22, a middle reduction gear 23 and the valve gear 13 for driving the throttle shaft 2 that rotates the throttle valve 1. The pinion gear 22 is secured to the outer periphery of the motor shaft of the driving motor 3. The middle reduction gear 23 engages with the pinion gear 22 to be rotated by the pinion gear 22. The valve gear 13 engages with the middle reduction gear 23 to be rotated by the middle reduction gear 23.

The pinion gear 22 is made of a metallic material, and is integrally formed with the motor shaft of the driving motor 3 to be in a predetermined shape, so that the pinion gear 22 serves as a motor gear that integrally rotates with the motor shaft of the driving motor 3. The middle reduction gear 23 is formed to be in a predetermined shape of a resinous material, and is rotatably provided onto the outer periphery of the supporting shaft 24 that serves as a rotation center of the middle reduction gear 23. The middle reduction gear 23 is constructed with a large gear part 25, which engages with the pinion gear 22 of the motor shaft, and a small gear part 26 that engages with the valve gear 13. The supporting shaft 24 is integrally molded with the bottom wall of the gearbox part 11 of the throttle body 5. An end part of the supporting shaft 24 engages with a recess portion formed in the inner wall of the sensor cover 12.

The valve gear 13 is integrally molded to be in a predetermined substantially cylindrical shape of a resinous material. Gear teeth (teeth part) 27 are integrally formed in the outer periphery of the valve gear 13 to engage with the small gear part 26 of the middle reduction gear 23. A cylindrical part (not shown) is integrally molded with the valve gear 13 on the side of the bore wall part 6 to protrude in the left direction in FIG. 1. The outer periphery of the cylindrical part (spring inner periphery guide) of the valve gear 13 supports the diametrically inner periphery of the coil spring 4. A full-close stopper portion 28 is integrally formed with the valve gear 13 on one end plane in the outer circumferential periphery of the valve gear 13, i.e., the gear teeth 27. The full-close stopper portion 28 hooks to the full-close stopper 17 of the gearbox part 11, when the throttle valve 1 is in the idling position, i.e., full close position.

The coil spring 4 is provided on the outer peripheral side of the throttle shaft 2. One end part of the coil spring 4 on the left side in FIG. 1 is supported by a body side hook (not shown) provided on the outer wall 6a of the bore wall part 6 of the throttle body 5, i.e., bottom wall of the gearbox part 11. The other end part of the coil spring 4 on the right side in FIG. 1 is supported by a gear side hook (not shown) provided on a plane of the valve gear 13 that is located on the side of the bore wall part 6.

The throttle body 5 is a throttle housing that includes the substantially cylindrical-shaped bore wall part 6 internally forming a circular-shaped intake passage, through which intake air flows into the engine 80. The bore wall part 6 internally receives the disc-shaped throttle valve 1, such that the throttle valve 1 can open and close the circular-shaped intake passage of the bore wall part 6. The bore wall part 6 rotatably receives the throttle valve 1 in the intake passage (bore), such that the throttle valve 1 can rotate from the full close position to the full open position. The throttle body 5 is screwed onto an intake manifold of the engine 80 using a fasting bolt or a screw (not shown).

As shown in FIG. 3, the bore wall part 6 of the throttle body 5 is formed in a predetermined shape that has a double-pipe structure, in which a substantially cylindrical-shaped bore outer pipe 32 is arranged on the diametrically outer side of a substantially cylindrical-shaped bore inner pipe 31. The bore inner pipe 31 is an internal side cylindrical part that forms an internal periphery. The bore outer pipe 32 is an external side cylindrical part that forms an outer member. The bore wall part 6 of the throttle body 5 is made of a thermo stable resinous material, such as PPS, PBTG30, PA, PP or PEI. The bore inner pipe 31 and the bore outer pipe 32 have an intake-air inlet part (air intake passage) and an intake-air outlet part (air intake passage). Intake air drawn from an air cleaner (not shown) passes through an intake pipe (not shown), the intake-air inlet part and the intake-air outlet part of the bore wall part 6. Subsequently, the intake air flows into a surge tank of the engine 80 or the intake manifold. The bore inner pipe 31 and the bore outer pipe 32 are integrally molded with each other. The bore inner pipe 31 and the bore outer pipe 32 have a substantially the same inner diameter and a substantially the same outer diameter along with the intake airflow direction, i.e., the direction from the upper side to the lower side in the vertical direction of FIG. 1.

The motor housing part 7, which receives the driving motor 3, is integrally molded of the resinous material with the bore wall part 6 via plural plate-shaped connecting members 9 to construct the throttle body 5. The motor housing part 7 is arranged in parallel with the bore wall part 6. That is, the motor housing part 7 is in parallel with the bore wall part 6 with respect to the gearbox part 11 in the throttle body 5. The motor housing part 7 is arranged on the radially outer side of the sidewall face 6a of the bore outer pipe 32 of the bore wall part 6 having the double-pipe structure, with respect to the central axial direction of the bore wall part 6. The motor housing part 7 is integrally molded of the resinous material with the gearbox part 11. Specifically, the motor housing part 7 is integrally molded with the end face of the gearbox part 11 located on the left side in FIG. 1. The gearbox part 11 has a chamber for rotatably receiving the reduction gears 300. The motor housing part 7 has a substantially cylindrical sidewall part 41 and a substantially circular shaped bottom wall part 42. The sidewall part 41 extends from the left side face of the gearbox part 11 in the left direction in FIG. 1. The bottom wall part 42 plugs the opening side of the sidewall part 41 on the left side in FIG. 1. The central axis of the sidewall part 41 of the motor housing part 7 is arranged substantially in parallel with the axis of the throttle shaft 2, i.e., rotation axis of the throttle valve 1. Besides, the central axis of the sidewall part 41 of the motor housing part 7 is arranged substantially perpendicularly to the central axis of the bore inner pipe 31 of the bore wall part 6.

The plural plate-shaped connecting members 9, which have a rib structure, are integrally molded of the resinous material with the bore outer pipe 32 of the bore wall part 6 and the motor housing part 7. The plural plate-shaped connecting members 9 protrude from the sidewall face 6a of the bore outer pipe 32 of the bore wall part 6, and connect to the sidewall face 7a of the sidewall part 36 of the motor housing part 7. Each of the plural plate-shaped connecting members 9 has flat faces on its both sides in a direction substantially perpendicular to the central axis of the bore outer pipe 32 of the bore wall part 6. Each of the flat faces of the plural plate-shaped connecting members 9 has substantially the same width and substantially the same length with respect to each other.

The plural plate-shaped connecting members 9 are arranged, such that the thickness direction of the plural plate-shaped connecting members 9 becomes substantially perpendicular to the central axis of the bore outer pipe 32 of the bore wall part 6. Besides, plural plate-shaped connecting members 9 are arranged substantially in parallel with each other in the direction that is substantially perpendicular to the central axis of the bore outer pipe 32 of the bore wall part 6.

The bore inner pipe 31 internally has an air intake passage, through which intake air flows to the engine 80. The throttle valve 1 and the throttle shaft 2 are rotatably provided in the air intake passage of the bore inner pipe 31. A cylindrical space (annular space) is formed between the bore inner pipe 31 and the bore outer pipe 32, and the cylindrical space is circumferentially blocked, i.e., partitioned, by an annular connecting part 33 at a substantially longitudinally central section thereof. For instance, the substantially longitudinally central section of the cylindrical space is a section along with a circumferential direction of the throttle valve 1 in the full close position. Namely, the substantially longitudinally central section is a circumferential section of the bore wall part 6 passing through the axial center of the throttle shaft 2. The annular connecting part 33 connects the outer periphery 31a of the bore inner pipe 31 and the inner periphery 32a of the bore outer pipe 32, such that the annular connecting part 33 blocks substantially entirely over the circumferential area of the cylindrical space formed between the bore inner pipe 31 and the bore outer pipe 32.

The cylindrical space between the bore inner pipe 31 and the bore outer pipe 32 located on the axially upstream side with respect to the annular connecting part 33 serves as a blockade recess part (moisture trapping groove) 34 for blocking moisture flowing along with the inner periphery of the intake pipe toward the intake manifold. The cylindrical space between the bore inner pipe 31 and the bore outer pipe 32 located on the axially downstream side with respect to the annular connecting part 33 serves as a blockade recess part (moisture trapping groove) 35 for blocking moisture flowing along with the inner periphery of the intake manifold.

Referring back to FIG. 1, the bore inner pipe 31 and the bore outer pipe 32 has the substantially cylindrical first valve bearing 41 and the substantially cylindrical second valve bearing (not shown) that are integrally molded of a resinous material. The first valve bearing 41 rotatably supports the first bearing sliding part of the throttle shaft 2. The second valve bearing rotatably supports the second bearing sliding part of the throttle shaft 2. A circular-shaped first shaft hole 43 is formed in the first valve bearing 41, and a circular-shaped second shaft hole (not shown) is formed in the second valve bearing. A plug (not shown) is provided on the first valve bearing 41 for plugging the opening side of the first valve bearing 41. The second valve bearing is integrally molded with the outer wall 6a of the bore wall part 6, i.e., bottom wall of the gearbox part 11 of the throttle body 5, to be protruded in the right direction in FIG. 1. The outer periphery of the second valve bearing serves as a spring inner periphery guide (not shown) for supporting the diametrically inner periphery of the coil spring 4. A stay part 45 is integrally molded of the resinous material on the outer periphery, i.e., outer wall 6a of the bore outer pipe 32. The stay part 45 is connected with a connecting end face of the intake manifold of the engine 80 using a fastening member such as a bolt (not shown), when the throttle body 5 is mounted on the engine 80. The stay part 45 is provided on the outer wall 6a of the bore outer pipe 32 located on the lower end side in FIG. 1. The stay part 45 radially outwardly protrudes from the surface of the outer wall 6a of the bore outer pipe 32, and has an insertion hole 46 through which the fastening member such as the bolt passes.

As follows, a forming process of the electrically controlled throttle apparatus is described referring to FIGS. 1 to 4. A molding process of the throttle body 5 includes a first clamping process and a second clamping process. In the first clamping process, molding dies are clamped with each other to form a first cavity (first valve cavity, first body cavity) that has an internal volume greater than a total volume of the molded throttle valve 1, for instance at least both the molded resinous disc part 14 and the molded throttle body 5. In the second clamping process, the molding dies are clamped with each other to form a second cavity (second valve cavity, second body cavity) that has an internal volume substantially the same as the total volume of the molded throttle valve 1, for instance at least both the molded resinous disc part 14 and the molded throttle body 5. The molding dies can be used in both the first clamping process and the second clamping process.

The molding dies include a fixed die (not shown) and a movable die (not shown) that have a protrusion and a recession corresponding to the resinous disc part 14, the resinous shaft part 15, the bore inner pipe 31, the bore outer pipe 32, the annular connecting part 33 and the like for molding the throttle body 5. A substantially flat plate-shaped compression core (movable core, slide core, movable die) is received in the movable die to be displaceable with respect to the movable die. The compression core (not shown) has a shape corresponding to the radially outer circumferential periphery 14b, 14c of the resinous disc part 14. The compression core is displaced with respect to the fixed die by a compression-core driving apparatus (not shown) constructed with a hydraulic cylinder, an air cylinder or the like.

When the compression core is in an initial position, i.e., before compression, the first cavity is formed among the fixed die, the movable die and the compression core. The first cavity has an internal volume greater than at least the total volume of the resinous disc part 14, the resinous shaft part 15, the bore inner pipe 31, bore outer pipe 32 and the annular connecting part 33. When the compression core is displaced to be in a forward position, i.e., after compression, the second cavity is formed among the fixed die, the movable die and the compression core. The second cavity has an internal volume substantially the same as a total volume of the resinous disc part 14, the resinous shaft part 15, the bore inner pipe 31, bore outer pipe 32 and the annular connecting part 33. The outer circumferential periphery 14b of the filler in the portion of the cavity for molding the resinous disc part 14 of the throttle valve 1 is compressed by a predetermined compression force. That is, the radially end plane of the outer circumferential periphery 14b of the resinous disc part 14 is compressed by a predetermined compression force.

In the first embodiment, the first cavity and the second cavity are formed to simultaneously mold the throttle valve 1 and the throttle body 5 using the same molding dies, such that the throttle valve 1 is assembled inside of the throttle body 5 in the molding process. Specifically, the throttle valve 1 is set at a position, in which the throttle valve 1 is rotated by a predetermined rotation angle from its full close position. The predetermined rotation angle is greater than the angle of the throttle valve 1 corresponding to its full close position. That is, the throttle valve 1 is rotated by a rotation angle (valve forming angle θ) to be set at a position excluding its full close position in the molding process thereof.

Figure 4A:
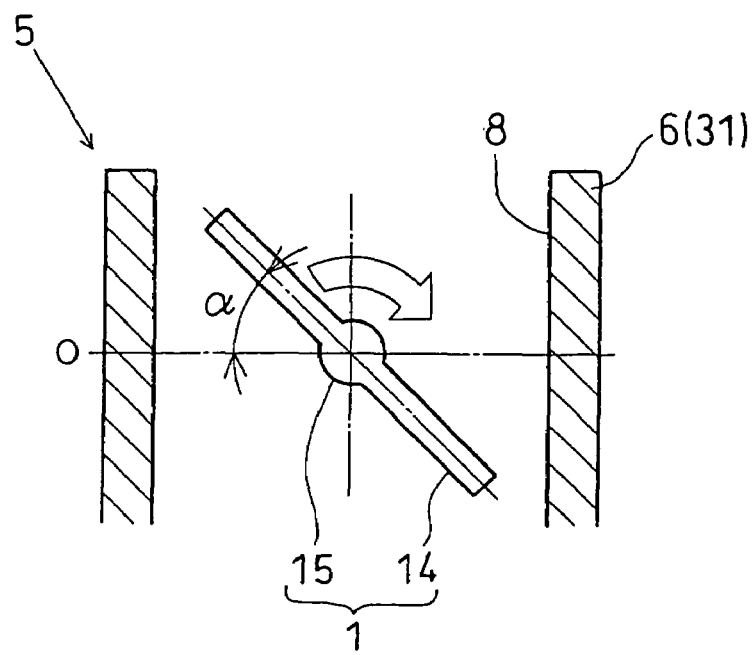
FIGS. 4A and 4B are schematic cross-sectional side views showing a rotation range of a throttle valve received in the bore wall part in a forming process thereof.
Figure 4B:
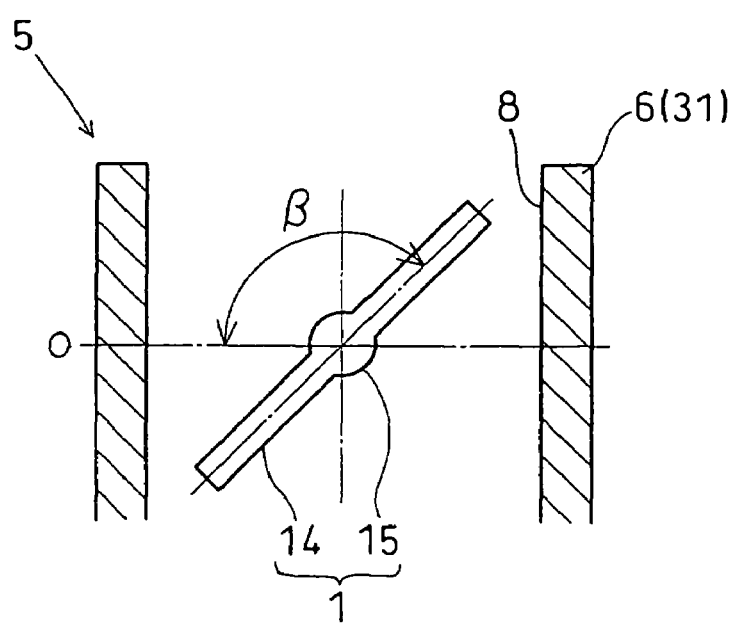

As shown in FIGS. 4A and 4B, the throttle valve 1 is molded of a resinous material in the same molding dies as that of the throttle body 5. In this situation, a rotation angle (valve forming angle θ) of the throttle valve 1 is set between a rotation angle α ($\geqq 45°$) and a rotation angle β ($\leqq 135°$) with respect to the rotation angle (0°) corresponding to the full close position of the throttle valve 1. The relation among α, β and θ is shown by the following equation (1).

$$\alpha < \theta < \beta \qquad (1)$$

Thus, the outer circumferential periphery 14b, 14c of the throttle valve 1 and the bore inner periphery 8 of the bore inner pipe 31 can be substantially entirely partitioned using the fixed die and the movable die of the molding dies. Here, one outer circumferential periphery of the throttle valve 1 around its rotation center (rotation axis) and a portion of the bore inner periphery 8 of the bore inner pipe 31, which is located in the vicinity of the first bearing 41, are connected via the throttle shaft (metallic shaft) 2. Besides, another gap between the other outer circumferential periphery of the throttle valve 1 around its rotation center and another portion of the bore inner periphery 8 that is located in the vicinity of the second bearing are also connected via the throttle shaft (metallic shaft) 2.

Heated thermo plastic (filler), i.e., thermo stable plastic such as PPS or PBT in a molten state is injected into the first cavity formed in the molding dies constructed with the fixed die, the movable die and the compression core. The filler is injected into the first cavity through at least one gate formed in the molding dies, so that the first cavity formed in the molding dies is filled with the filler (molten resinous material), in an injection-filling process. In this situation, the throttle shaft (metallic shaft) 2 is set in the predetermined position in the first cavity.

Subsequently, pressure applied to the filler in the molding dies is gradually increased, and the increased pressure is maintained at a pressure greater than the maximum pressure applied to the injected filler in the injection-filling process. That is, predetermined pressure greater than injection pressure is applied to the filler (molten resinous material) filled in the molding dies. Subsequently, cooling water is introduced into the molding dies. In this situation, the filler contracts (shrinks) in the molding dies due to the cooling process. Therefore, additional filler is injected into the first cavity through at least one gate formed in the molding dies to refill additional filler by an amount equivalent to a reduced volume of the molded filler due to the contraction caused in the cooling process, in a pressure holding process. The gate can be formed in the molding dies in at least one of the cavities molding the resinous disc part 14, the resinous shaft part 15, the bore inner pipe 31, the side of the bore outer pipe 32 and/or the side of the motor housing part 7.

Filler (molten resinous material) is filled into the first cavity by an amount equal to or greater than a predetermined volume, e.g., by 80% of the volume of the first cavity. Subsequently, at least one gate is closed (gate cut) and the compression core is slid to a forward position (after compression) in a direction, in which the compression core approaches the fixed die to form the second cavity among the fixed die, movable die and the compression core in a compression process in the injection-filling process and/or the pressure holding process. Thus, the outer circumferential periphery, i.e., compressed part 14b of the filler in the portion of the cavity (valve cavity) for molding the resinous disc part 14 of the throttle valve 1 is compressed by a predetermined compression force. That is, the outer circumferential periphery 14b of the radially outer end periphery of the resinous disc part 14 is compressed in the compression process.

Another radially outer circumferential periphery (another compressed part) 14c of the resinous disc part 14, which is located on the opposite end side as the outer circumferential periphery (compressed part) 14b with respect to the resinous disc part 14 may be compressed using another compression core (not shown), simultaneously with compressing the outer circumferential periphery 14b of the resinous disc part 14.

In this situation, the molding dies are clamped with each other, so that the radial dimension of the resinous disc part 14 of the throttle valve 1 becomes equivalent to the molded resinous disc part 14 in the second clamping process. Subsequently, the filler filled in the second cavity of the molding die is taken out, and is cooled to be solidified. Alternatively, the filler filled in the second cavity of the molding die is cooled to be solidified using cooling water or the like, while the filler is received in the second cavity. Thus, the throttle body 5 including the bore wall part 6 having a double pipe structure, which rotatably receives the throttle valve 1 and the throttle shaft 2, can be simultaneously molded. The throttle shaft 2 is insert molded in the resinous shaft part 15 of the throttle valve 1.

As follows, an operation of the electrically controlled throttle apparatus is described. When the driver steps the accelerator pedal of the vehicle, the accelerator position signal, which is transmitted from the accelerator position sensor to the ECU, changes. The ECU controls electric power supplied to the driving motor 3, so that the motor shaft of the driving motor 3 is rotated and the throttle valve 1 is operated to be in a predetermined position. The torque of the driving motor 3 is transmitted to the valve gear 13 via the pinion gear 22 and the middle reduction gear 23. Thus, the valve gear 13 rotates by a rotation angle corresponding to the stepping degree of the accelerator pedal, against urging force generated by the coil spring 4.

Therefore, the valve gear 13 rotates, and the throttle shaft 2 also rotates by the same angle as the rotation angle of the valve gear 13, so that the throttle valve 1 rotates from its full close position toward its full open position in the open direction. As a result, the air intake passage formed in the bore inner pipe 31 of the bore wall part 6 of the throttle body 5 is opened by a predetermined degree, so that rotation speed of the engine 80 is changed to be a rotation speed corresponding to the stepping degree of the accelerator pedal by the driver.

By contrast, when the driver releases the accelerator pedal, the throttle valve 1, the throttle shaft 2, the valve gear 13 and the like return to an initial position of the throttle valve 1 by urging force of the coil spring 4. The initial position of the throttle valve 1 is an idling position or the full close position. When the driver releases the accelerator pedal, the value of the accelerator position signal transmitted by the accelerator position sensor becomes substantially 0%. Therefore, in this situation, the ECU can supply electric power to the driving motor 3 in order to rotate the motor shaft of the driving motor 3 in its reverse direction, so that the throttle valve 1 is controlled at its full close position. In this case, the throttle valve 1 can be rotated in the close direction by the driving motor 3.

The throttle valve 1 rotates in the close direction by urging force of the coil spring 4 until the full-close stopper portion 28 provided on the valve gear 13 contacts the full-close stopper 17 integrally molded on the inner wall of the gearbox part 11 of the throttle body 5. Here, the close direction is a direction, in which the throttle valve 1 closes the air intake passage by rotating from the full open position to the full close position. Rotation of the throttle valve 1 is restricted by the full-close stopper 17 at the full close position of the throttle valve 1. Therefore, the throttle valve 1 is maintained in the predetermined full close position, i.e., idling position, in the air intake passage formed in the bore inner pipe 31 of the bore wall part 6 of the throttle body 5. Thus, the air intake passage connected to the engine 80 is substantially closed, so that rotation speed of the engine 80 is set at a predetermined idling speed.

In this embodiment, the throttle valve 1 is molded of a resinous material, such that the throttle valve 1 is rotatably assembled in the bore wall part 6 of the throttle body 5 while the throttle valve 1 is set to be in the predetermined throttle position, in the electrically controlled throttle apparatus. Specifically, the throttle valve 1 is rotated by a predetermined rotation angle (valve forming angle $\theta$) from its full close position. The valve forming angle $\theta$ is set between a rotation angle $\alpha$ ($\geqq 45°$) and a rotation angle $\beta$ ($\leqq 135°$) with respect to the rotation angle (0°) corresponding to the full close position of the throttle valve 1. Thus, the throttle valve 1 can be simultaneously formed with the bore wall part 6 of the throttle body 5 in the same molding dies of the bore wall part 6.

At least the outer circumferential periphery 14b of the filler in the first cavity is compressed by a predetermined pressure when the throttle valve 1 and the throttle body 5 are molded in the injection-filling process and/or the pressure holding process. The outer circumferential periphery 14b, 14c of the filler, which is molded to be the throttle valve 1, is located on the substantially perpendicularly end sides with respect to the rotation axis of the resinous disc part 14 of the throttle valve 1.

Therefore, dispersion of contraction (shrinkage) of the resinous disc part 14 of the throttle valve 1 in a direction perpendicular to the rotation axis of the resinous disc part 14 can be reduced in its molding process by adding the compression process. In a molding process without the compression process, contraction behavior may be largely varied in the resinous disc part 14 because of orientation of polymer molecule caused by flow of the resinous material, in the injection-filling process and/or the pressure holding process. However in the compression molding process, orientation of the polymer molecule can be randomized in the compression process, thus, difference of contraction of the resinous disc part 14 caused by orientation of polymer molecule can be reduced. Additionally, even the volume of the resinous disc part 14 is reduced due to contraction caused in its molding process, the resinous disc part 14 is compressed in its compression process, so that dispersion of contraction and difference of contraction of the molded resinous disc part 14 can be reduced. That is, the molded product such as the molded resinous disc part 14, which contracts in its molding process, can be compressed by the compression core, and formed to be in its predetermined shape by the compression core and molding dies. Thus, deformation of the molded product, e.g., throttle valve 1 due to its contraction occurring in its molding process can be compensated and reduced by additional shaping in its compression process using the compression core.

Thus, dimensional accuracy of the molded product, e.g., throttle valve 1 can be enhanced. Furthermore, a gap, which is formed between the cylindrical inner periphery 8 of the bore inner pipe 31 of the bore wall part 6 and the outer circumferential periphery of the resinous disc part 14 of the throttle valve 1, can be uniformed, so that dispersion of air tightness of the throttle valve 1 can be reduced when the throttle valve 1 is in its full close position in the idling operation of the vehicle. When the throttle valve 1 and the throttle body 5 are simultaneously molded in the same molding dies, the throttle valve 1 is molded of a resinous material, such that the throttle valve 1 is rotatably assembled in the bore wall part 6 of the throttle body 5 while the throttle valve 1 is set to be in the predetermined throttle position. The gap, which is formed between the cylindrical inner periphery 8 of the bore inner pipe 31 of the throttle body 5 and the outer circumferential periphery of the throttle valve 1, can be maintained in a predetermined dimension using the molding die. Therefore, cost needed for manufacturing the molding dies can be largely reduced, and molding process can be largely reduced, so that this molding method can produce a cheaper electrically controlled throttle apparatus.

The throttle shaft (metallic shaft) 2 is insert molded in the resinous shaft part 15 of the throttle valve 1 when the resinous shaft part 15 and the bore inner pipe 31 are simultaneously molded. Therefore, the throttle valve 1 and the bore inner pipe 31 are completely divided at both ends of the throttle shaft 2, i.e., the first bearing sliding part and the second bearing sliding part, in which the resinous shaft part 15 and the bore inner pipe 31 are connected with each other via the throttle shaft (metallic shaft) 2. Specifically, the throttle shaft 2 is formed of a material, which is not adhesive to a material formed to be the throttle body 5 and the resinous shaft part 15. That is, the material of the throttle shaft 2 and the material of both the throttle body 5 and the resinous shaft part 15 do not weld to be joined with each other. Therefore, the throttle body 5 and the resinous shaft part 15 can be partitioned by the molding dies and separated from each other by the throttle shaft (molding member) 2.

Thus, the throttle valve 1 and the throttle body 5 can be simultaneously molded in the same molding dies. Additionally, the gap, which is formed between the cylindrical inner periphery 8 of the bore inner pipe 31 of the throttle body 5 and the outer circumferential periphery 14b, 14c of the throttle valve 1, can be maintained in a predetermined dimension using the molding die.

Thus, interference between the outer circumferential periphery 14b, 14c of the throttle valve 1 and the bore inner periphery 8 of the bore inner pipe 31 of the bore wall part 6 can be restricted over a rotation range (rotation angle range) of the throttle valve 1 from its full close position to its full open position. Therefore, the throttle apparatus including the throttle valve 1 can be restricted from occurrence of malfunction. Besides, airtightness can be maintained when the throttle valve 1 is in the full close position, and leakage of intake air in the idling operation of the vehicle can be decreased. The amount of fuel, for instance gasoline, consumed in the engine 80 is controlled in accordance with a flow amount of intake air. Accordingly, reduction of the leakage of intake air in the idling operation contributes to improvement of fuel efficiency of the vehicle.

The molded throttle valve 1 and the molded throttle body 5 are arranged to be apart from each other by predetermined axial gaps. Specifically, a predetermined gap is formed among the bore inner periphery 8 of the bore inner pipe 31, the resinous disc part 14 of the throttle valve 1, and the resinous shaft part 15 of the throttle valve 1. In detail, a predetermined gap is formed in the axial direction of the throttle shaft 2 between a portion of the bore inner periphery 8 located around the first valve bearing 41 (i.e., the first shaft hole 43) and the resinous disc part 14 that are opposed with each other. Besides, a predetermined gap is formed in the axial direction of the throttle shaft 2 between a portion of the bore inner periphery 8 located around the first valve bearing 41 and one axial end of the resinous shaft part 15 located on the left side in FIG. 1 that are opposed with each other. A predetermined gap is formed in the axial direction of the throttle shaft 2 between a portion of the bore inner periphery 8 located around the second valve bearing (i.e., the second shaft hole) and the resinous disc part 14 that are opposed with each other. Besides, a predetermined gap is formed in the axial direction of the throttle shaft 2 between a portion of the bore inner periphery 8 located around the second valve bearing (i.e., the second shaft hole) and the other axial end of the resinous shaft part 15 located on the right side in FIG. 1 that are opposed with each other.

The throttle shaft (metallic shaft) 2, which is insert molded in the resinous shaft part 15, is rotatably supported at the first bearing sliding part and the second bearing sliding part thereof by the first valve bearing 41 and the second valve bearing, respectively. The throttle valve 1 and the throttle shaft 2 are integrally rotated. Interference between the outer circumferential periphery of the throttle valve 1 and the bore inner periphery 8 of the bore inner pipe 31 of the bore wall part 6 can be restricted over a rotation range (rotation angle range) of the throttle valve 1 from its full close position to its full open position. Thus, the throttle valve 1 and the throttle shaft 2 can rotate in the bore inner periphery 8 of the bore inner pipe 31 of the bore wall part 6.

Second Embodiment

Figure 5:
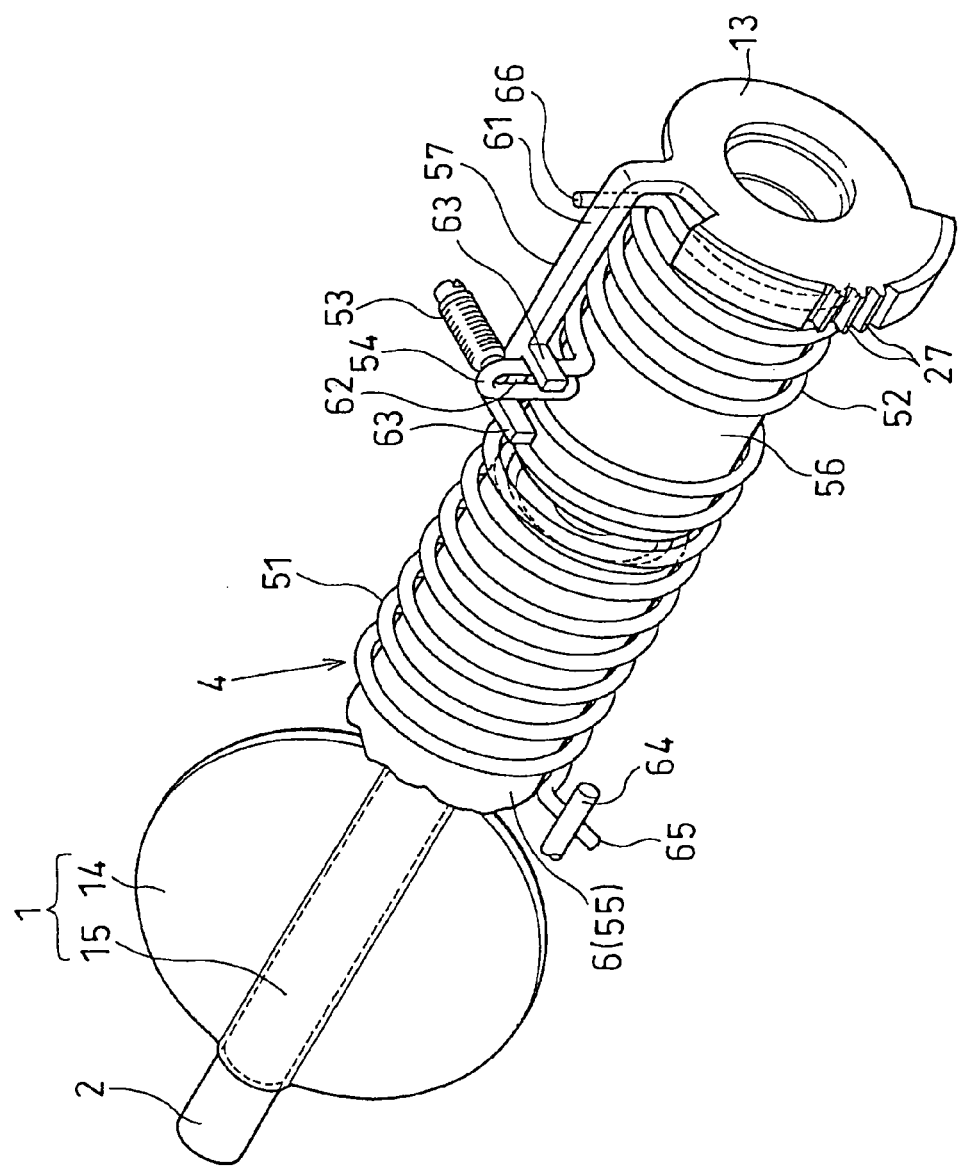
FIG. 5 is a perspective view showing an inner mechanism of the electrically controlled throttle apparatus according to a second embodiment of the present invention.

As shown in FIG. 5, the electrically controlled throttle apparatus in the second embodiment has a coil spring 4 constructed with a first spring part (return spring) 51 and a second spring part (default spring) 52. The return spring 51 serves as a returner spring and the default spring 52 serves as an opener spring. The return spring 51 and the default spring 52 are integrated into one coil spring (valve forcing means) 4 that urges a throttle valve 1 in the close direction and in the open direction of the throttle valve 1. The coil spring 4 is arranged between the outer wall 6a of the bore wall part 6, i.e., bottom wall of the gearbox part 11 and a plane of the valve gear 13 that is located on the side of the bore wall part 6. A connecting member between the return spring 51 and the default spring 52 is bent to be in a substantially U-shape to serve as a U-shaped hook part 54 supported by a middle stopper member 53. Both sides of the coil spring 4 are wound in different directions from each other. That is, the return spring 51 is wound in one direction, and the default spring 52 is wound in the opposite direction with respect to the winding direction of the return spring 51.

A boss-shaped middle position stopper (not shown) is provided in the gearbox part 11 of the throttle body 5, such that the middle position stopper internally protrudes in the gearbox part 11. A middle stopper member 53 (adjust screw) is screwed into the middle position stopper for mechanically maintaining the throttle valve 1 at a predetermined middle position using urging force of the return spring 51 and urging force of the default spring 52 when power supplied to the driving motor 3 is terminated. The urging force of the return spring 51 and the urging force of the default spring 52 are applied in different directions from each other. The predetermined middle position of the throttle valve 1 is a position between the full close position and the full open position. A cylindrical spring inner periphery guide 55 is integrally formed with the outer wall 6a of the bore wall part 6, i.e., bottom wall of the gearbox part 11 of the throttle body 5, to be protruded in the right direction in FIG. 6. The outer periphery of the spring inner periphery guide 55 supports the diametrically inner periphery of the coil spring 4. Another cylindrical spring inner periphery guide 56 is integrally formed with the plane of the valve gear 13 that is located on the side of the bore wall part 6. The cylindrical spring inner periphery guide 56 protrudes in the left direction in FIG. 6. The outer periphery of the spring inner periphery guide 56 supports the diametrically inner periphery of the coil spring 4.

An opener member 57 is integrally molded of a resinous material with the valve gear 13 in this embodiment. The opener member 57 is located on the side of the bore wall part 6 with respect to the valve gear 13, and is urged by the default spring 52 from the full close position toward the middle position in the open direction. A gear-side hook (second hooking part) 61, a hooking part 62 and slip restricting guides 63 are integrally formed with the opener member 57.

Figure 6:
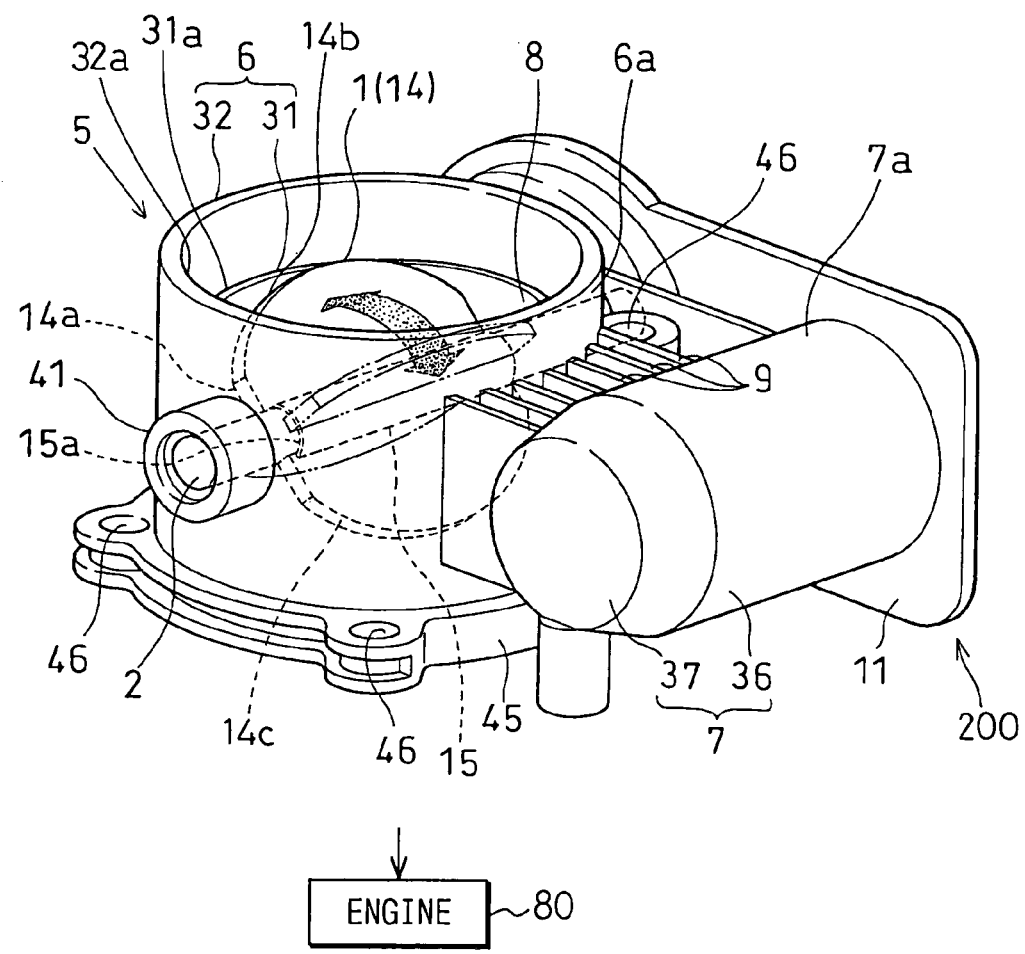
FIG. 6 is a perspective view showing an electrically controlled throttle apparatus according to a third embodiment of the present invention.
Figure 7:
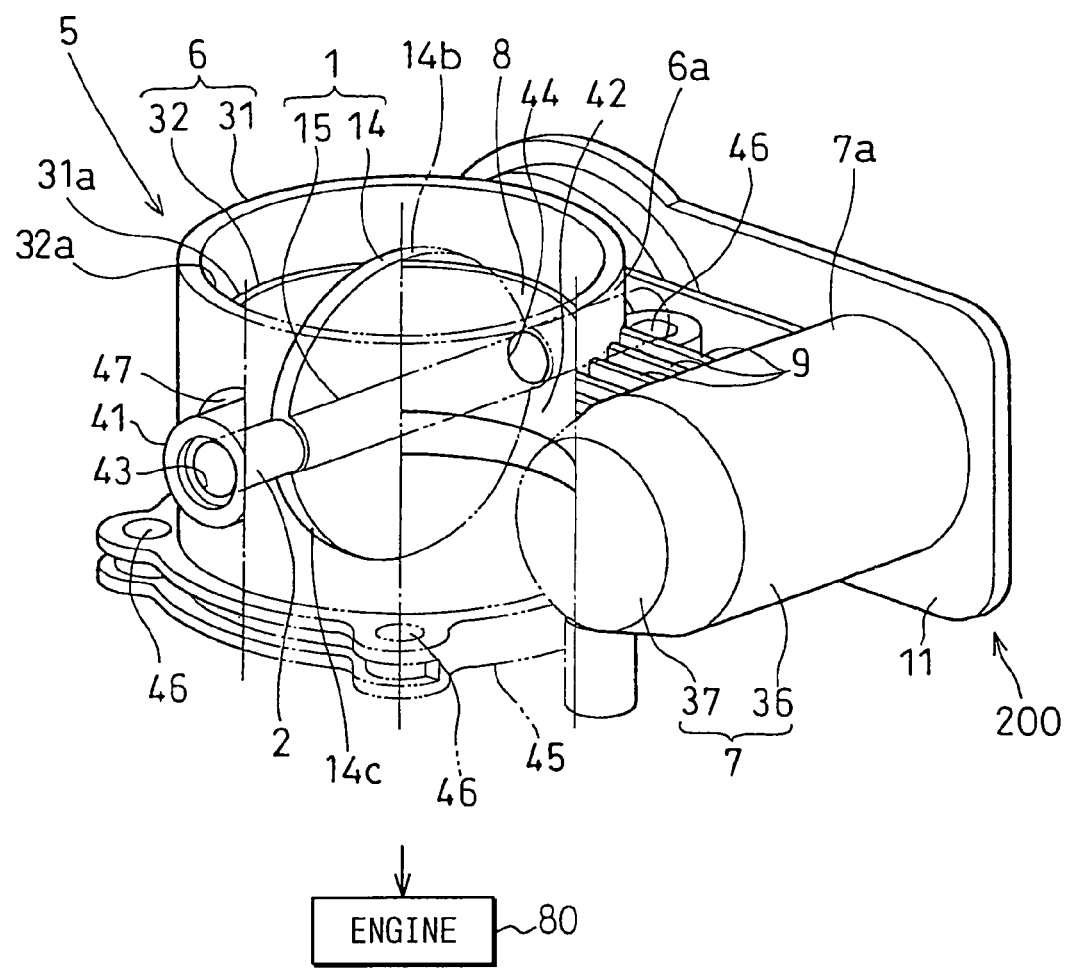
FIG. 7 is a perspective view showing an electrically controlled throttle apparatus according to a fourth embodiment of the present invention.
Figure 8:
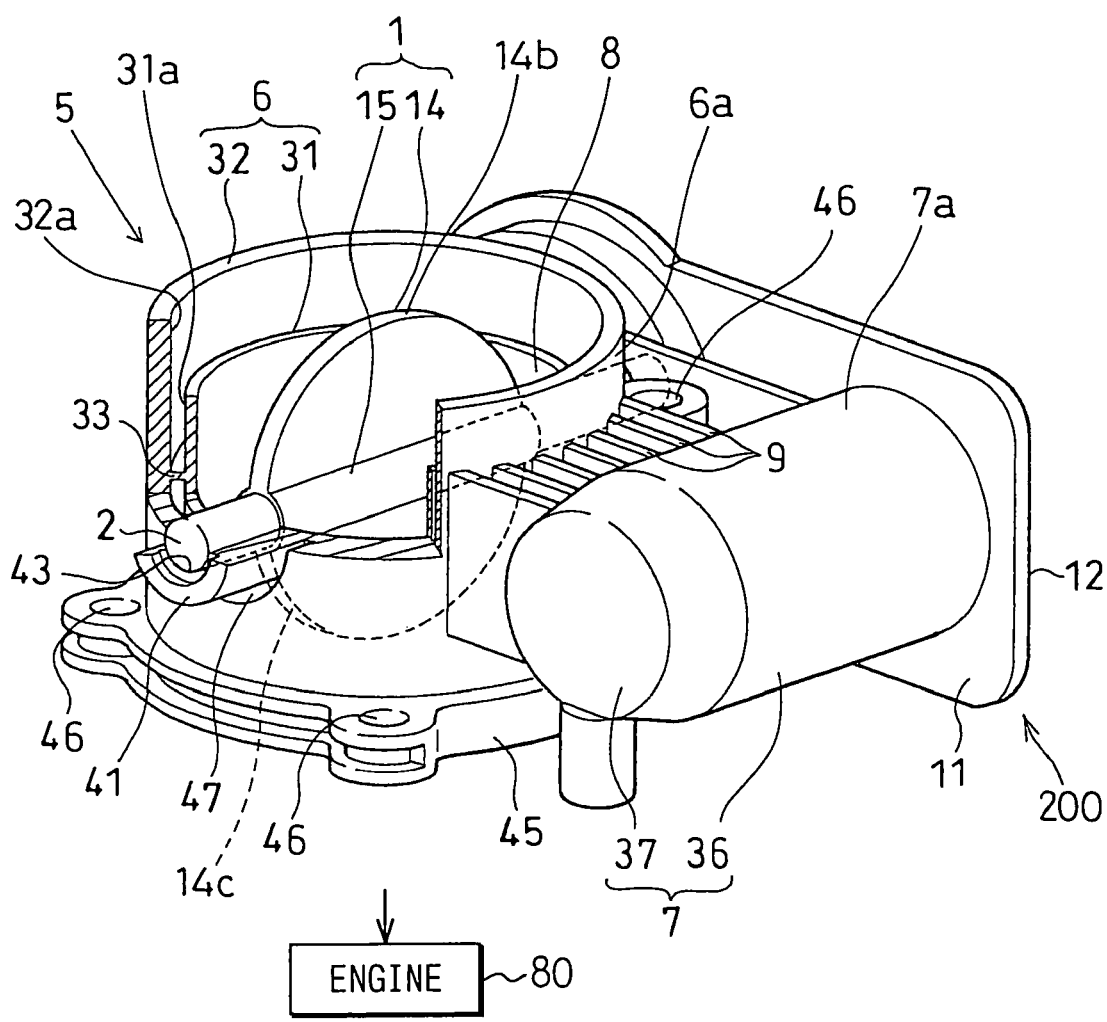
FIG. 8 is a perspective partially cross-sectional view showing an electrically controlled throttle apparatus according to a fourth embodiment of the present invention.
Figure 9:
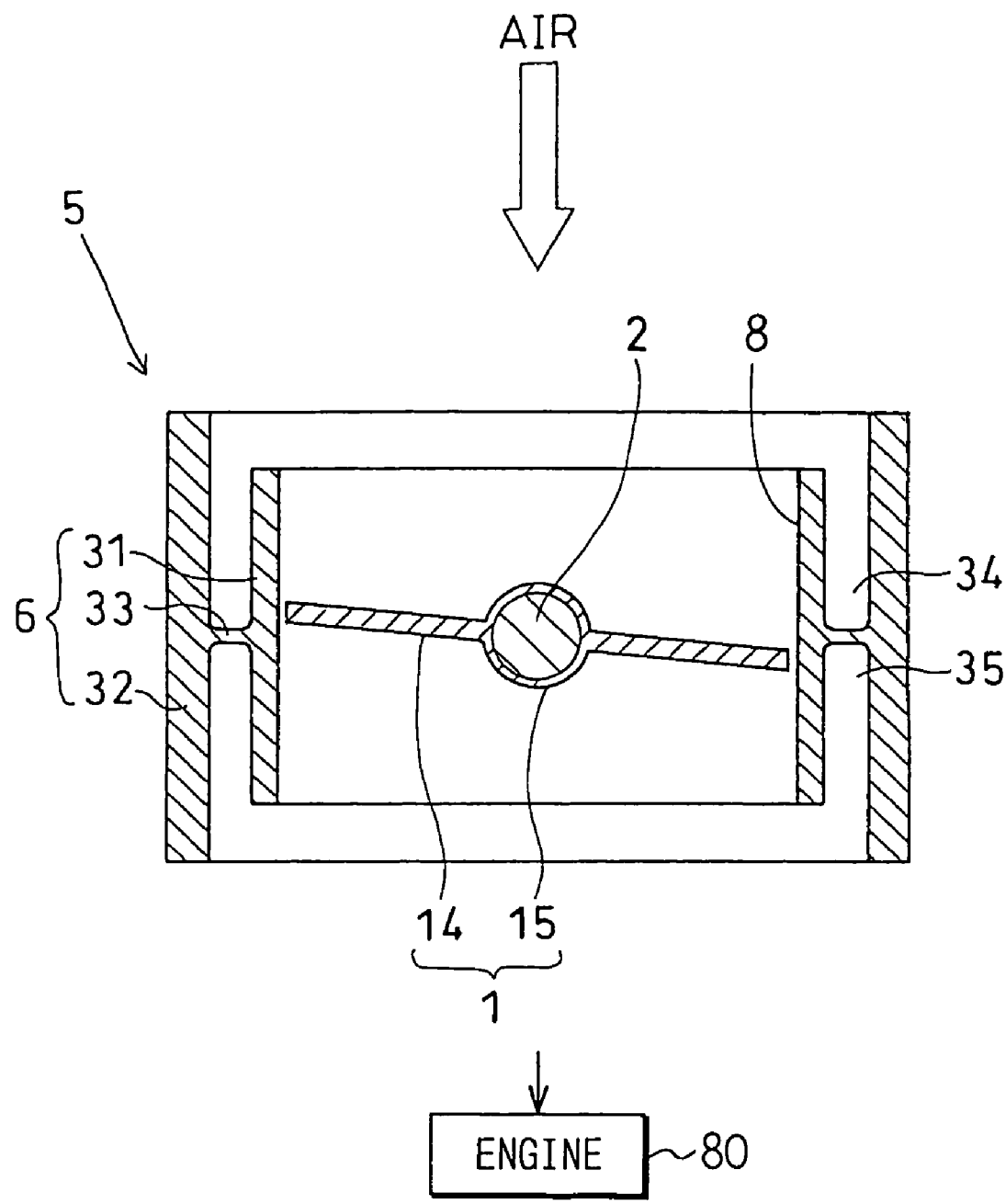
FIG. 9 is a schematic cross-sectional side view showing a double-pipe structure of a bore wall part provided in the throttle body according to the fourth embodiment.

The gear-side hook 61 hooks to one end of the default spring 52 of the coil spring 4 in the right end in FIG. 6. The hooking part 62 detachably hooks to the U-shaped hook part 54 connecting the return spring 51 and the default spring 52. The slip restricting guides 63 are arranged near the hooking part 62 for restricting movement of the U-shaped hook part 54 in the axial direction of the coil spring 4.

A spring body-side hook (first hooked part) 65 is provided on one end side of the return spring 51 of the coil spring 4, which is located on the side of the bore wall part 6 on the left side in FIG. 6. The spring body-side hook 65 hooks to a body-side hook 64 (first hooking part) that is integrally formed with the outer wall 6a of the bore wall part 6, i.e., bottom wall of the gearbox part 11 of the throttle body 5. A spring gear-side hook (second hooked part) 66 is provided on the side of the default spring 52 of the coil spring 4, which is located on the side of the valve gear 13, i.e., on the right side in FIG. 6. The spring gear-side hook 66 hooks to the gear-side hook (second hooking part) 61 of the opener member 57.

As follows, an operation of the electrically controlled throttle apparatus, when power supplied to the driving motor 3 is terminated, is described. The hooking part 62 of the opener member 57 contacts the U-shaped hook part 54 of the coil spring 4, while the opener member 57 is inserted between the connecting end part of the default spring 52, i.e., the U-shaped hook part 54, and the spring gear-side hook 66. In this situation, the hooking part 62 and the U-shaped hook part 54 are urged onto each other by urging force of the return spring 51 and urging force of the default spring 52 used as the opener spring. Here, the return spring 51 returns the throttle valve 1 from its full open position to its full close position via the opener member 57. The default spring 52 returns the throttle valve 1 from its full close position to its middle position via the opener member 57. Thus, the throttle valve 1 can be maintained at the middle position, so that a fall back operation, i.e., failsafe operation can be performed when power supplied to the driving motor 3 is terminated.

Third Embodiment

As shown in FIG. 6 in the third embodiment, both axial ends of the resinous shaft part 15 of the throttle valve 1 are axially recessed from its circular peripheral ends by a predetermined length in order to form a first annular end face 15*a* and a second annular end face. Referring back to the first embodiment, the molding dies need a thin portion over a large area to form a thin gap between the outer circumferential periphery of the throttle valve 1 and the bore inner periphery 8 of the bore inner pipe 31. On the contrary in the third embodiment, molding dies need a thin portion in a more limited reduced area compared with the first embodiment, because broader gaps are formed around the first annular end face 15*a* and the second annular end face between the throttle valve 1 and the bore inner pipe 31. Accordingly, durability of the molding dies can be enhanced. A first flat section (substantially linear section, notch section, groove) 14*a* and a second flat section are formed on both end sides in the outer circumferential periphery of the resinous disc part 14 of the throttle valve 1 to extend in parallel with the central axis of the bore inner pipe 31 of the throttle body 5, when the throttle valve 1 is in its full open position.

In the above joint structure provided between the throttle valve 1 and the bore inner pipe 31, a portion of the molding dies can pass through the broad gap formed between the outer circumferential periphery of the throttle valve 1 and the bore inner periphery 8 of the bore inner pipe 31. The portions of the molding dies, which pass through the broad gaps formed around the first annular end face 15*a*, the second annular end face, the first flat section 14*a* and the second flat section, need not to be thin. Accordingly, durability of the molding dies can be enhanced. Furthermore, in this structure, when the throttle valve 1 and the bore wall part 6 of the throttle body 5 are simultaneously molded of a resinous material, the outer circumferential periphery of the throttle valve 1 and the bore inner periphery 8 of the bore inner pipe 31 do not directly contact each other. Therefore, a predetermined gap can be formed between the throttle valve 1 and the bore inner periphery 8 in its molding process.

Fourth Embodiment

As shown in FIGS. 7 to 10, in the fourth embodiment, axial thickness (axial board thickness) of the annular connecting part 33 in its axial direction is set to be less than the minimum radial thickness of a portion of the bore inner pipe 31 around the annular connecting part 33 and the minimum radial thickness of a portion of the bore outer pipe 32 around the annular connecting part 33. Besides, the axial board thickness of the annular connecting part 33 is set to be less than the radial thickness, i.e. radial wall thickness of the annular connecting part 33. Furthermore, radial thickness of the bore outer pipe 32 is set to be greater than the radial thickness of the bore inner pipe 31.

The bore wall part 6 having a double pipe structure including the substantially cylindrical bore inner pipe 31, the substantially cylindrical bore outer pipe 32 and substantially annular connecting part (annular partition wall) 33 that are integrally molded of a resinous material. In this structure, the radial thickness of the annular connecting part 33 of the bore wall part 6 becomes large, and the axial board thickness of the annular connecting part 33 becomes small. Therefore, rigidity and strength of the annular connecting part 33 largely decreases, so that the annular connecting part 33 can be flexibly deformed, and contraction of the bore outer pipe 32 occurring in its molding process does not have a large influence to the bore inner pipe 31. Therefore, the inner periphery 8 of the bore inner wall 31 can be restricted from being deformed due to contraction of the bore outer pipe 32 occurring in its molding process.

In this embodiment, the first valve bearing 41 is connected to the inner periphery 32*a* of the bore outer pipe 32 via the bore inner pipe 31 and the annular connecting part 33. The first valve bearing 41 is integrally molded of a resinous material with the outer periphery 31*a* of the bore inner pipe 31. The first valve bearing 41 protrudes from the outer periphery 31*a* of the bore inner pipe 31 in a direction substantially in parallel with the rotation center of the throttle valve 1, i.e., axial direction of the throttle shaft 2. A substantially annular recess 47 is formed around the first valve bearing 41 in the circumferential outer periphery of the outer wall 6*a* of the bore outer pipe 32. The second valve bearing may be connected to the inner periphery 32*a* of the bore outer pipe 32 via the bore inner pipe 31 and the annular connecting part 33. Another substantially annular recess may be formed around the second valve bearing.

In this embodiment, molding dies include a fixed die 71 and a movable die 72 that have a protrusion and a recession corresponding to the resinous disc part 14, the resinous shaft part 15, the bore inner pipe 31, the bore outer pipe 32, the annular connecting part 33 and the like for molding the throttle body 5, similarly to that of the first embodiment. A substantially flat-shaped compression core (movable core, slide core, movable die) 73 is received in the movable die 72 to be displaceable with respect to the movable die 72. The shape of the compression core (valve compression core) 73 corresponds to the outer circumferential periphery 14*b* of the resinous disc part 14. The compression core 73 is displaced with respect to the fixed die 71 by a compression-core driving apparatus (not shown) constructed with a hydraulic cylinder, an air cylinder or the like.

Figure 10A:
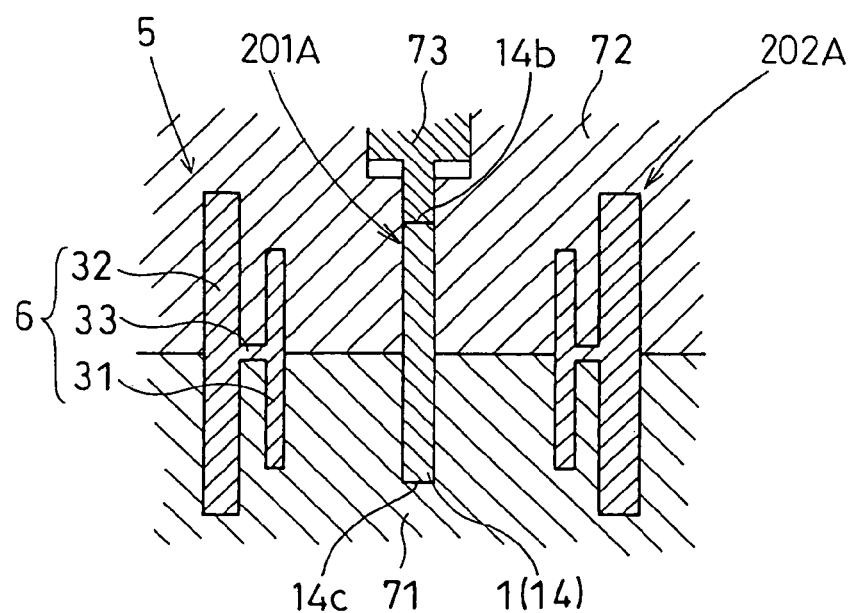
FIG. 10A is a schematic cross-sectional side view showing the first cavity formed in dies in an injection press forming process of the throttle body.
Figure 10B:
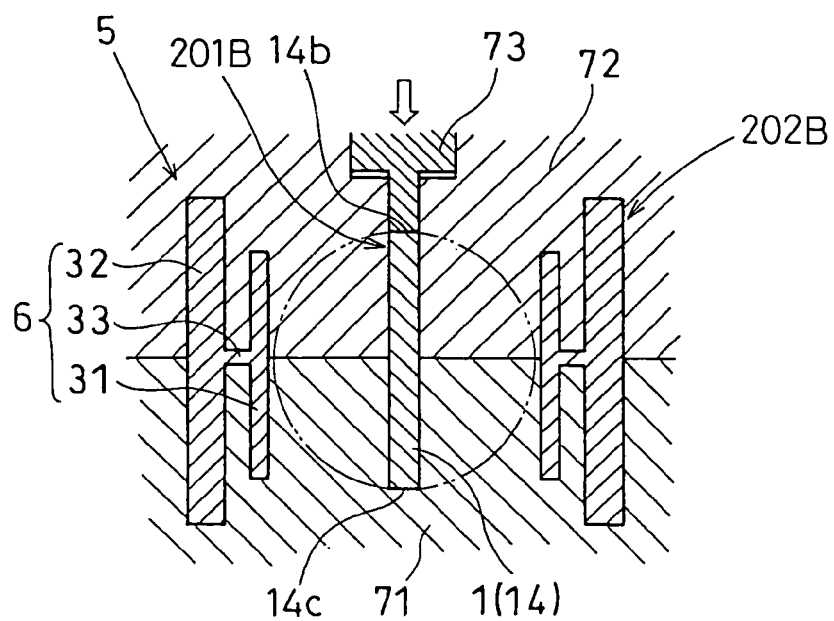
FIG. 10B is a schematic cross-sectional side view showing the second cavity formed in the dies in the injection press forming process of the throttle body according to the fourth embodiment.

As shown in FIG. 10A, when the compression core 73 is in an initial position, i.e., before compression, a first cavity (valve cavity) 201A is formed among the fixed die 71, the movable die 72 and the compression core 73. The first cavity 201A has an internal volume greater than at least a volume of the molded resinous disc part 14. When the compression core 73 is displaced to be in a forward position, i.e., after compression as shown in FIG. 10B, the second cavity (valve cavity) 201B is formed among the fixed die 71, the movable die 72 and the compression core 73. The second cavity 201B has an internal volume substantially the same as a volume of the molded resinous disc part 14. Simultaneously, filler in the cavity 201A for molding the resinous disc part 14 is compressed at the outer circumferential periphery, i.e., the outer circumferential periphery 14*b* of the resinous disc part 14 by a predetermined pressure.

In this embodiment, the throttle valve 1 is simultaneously integrally molded in the same molding dies as that of the throttle body 5 to be rotatable in the bore wall part 6 of the throttle body 5. Specifically, the throttle valve 1 is formed in the throttle body 5 when the throttle valve 1 is inclined from its full close position by a predetermined angle that is larger than the angle corresponding to the full close position of the throttle valve 1. That is, the throttle valve 1 is formed in the throttle body 5 when the throttle valve 1 is in a position excluding the full close position. For example, the throttle valve is rotated by an angle corresponding to its full open position, i.e., valve forming angle $\theta=90°$. In this situation, a portion of the outer circumferential periphery of the throttle valve 1, which is perpendicular to the rotation axis of the throttle valve 1, becomes substantially parallel to the central axis of the bore inner pipe 31 of the bore wall part 6 of the throttle body 5.

Filler (molten resinous material) is filled into the first cavity 201A by an amount equal to or greater than a predetermined volume, e.g., by 80% of the volume of the first cavity 201A. Subsequently, at least one gate is closed (gate cut) and the compression core 73 is slid to a forward position (after compression) in a direction, in which the compression core 73 approaches the fixed die 71 to form the second cavity 201B among the fixed die 71, movable die 72 and the compression core 73 in a compression process that is in the injection-filling process and/or the pressure holding process. Thus, filler in the cavity 201A for molding the resinous disc part 14 of the throttle valve 1 is compressed at its outer circumferential periphery, i.e., the outer circumferential periphery 14b of the resinous disc part 14 by a predetermined pressure. In this situation, the throttle valve 1 is rotated by the predetermined angle, so that the portion of the outer circumferential periphery 14b of the throttle valve 1 can be easily compressed by the compression core 73.

The annular connecting part 33, which connects the bore inner pipe 31 and the bore outer pipe 32, and each of the plural plate-shaped connecting members 9, which connects the motor housing part 7 and the bore outer pipe 32, can be formed to be in a thin-walled elongated plate shape. Therefore, a forming cycle of the throttle body 5, specifically the annular connecting part 33 and the plate-shaped connecting members 9 can be reduced compared with a structure, in which the annular connecting part 33 and the plate-shaped connecting members 9 are formed to be a thick member.

Besides, the recess 47 can be formed around the first valve bearing 41, and the first valve bearing 41 can be formed to connect to the inner periphery 32a of the bore outer pipe 32 via the bore inner pipe 31 and the annular connecting part 33. Thus, the inner periphery 8 of the bore inner wall 31 can be restricted from deformation caused by contraction of the motor housing part 7 and bore outer pipe 32, so that airtightness can be maintained when the throttle valve 1 is in the full close position. Additionally, the bore inner pipe 31, bore outer pipe 32 and the motor housing part 7 can be restricted from occurrence of shortcut thereof. Furthermore, a supporting portion (e.g., connecting members 9) can be also restricted from formation of weld thereof, using the above injection press molding process, in addition to the effect obtained in the first embodiment.

Besides, among the resinous disc part 14 of the throttle valve 1, both axial ends of the resinous shaft part 15 of the throttle valve 1, portions of the bore inner periphery 8, which is located around the first valve bearing 41 and a second valve bearing 42, i.e., the first shaft hole 43 and a second shaft hole 44 can be partitioned in the throttle body 5 using thin molding dies.

Thus, the throttle valve 1 and the throttle body 5 can be simultaneously molded using the same molding dies, such that the throttle valve 1 is rotatably assembled inside of the bore inner pipe 31 of the bore wall part 6 of the throttle body 5 in its molding process. The gap, which is formed between the cylindrical bore inner periphery 8 of the bore inner pipe 31 of the throttle body 5 and the outer circumferential periphery 14b, 14c of the throttle valve 1, can be maintained in a predetermined dimension using the molding die. Interference between the outer circumferential periphery 14b, 14c of the throttle valve 1 and the bore inner periphery 8 of the bore inner pipe 31 of the bore wall part 6 can be restricted over a rotation range (rotation angle range) of the throttle valve 1 from its full close position to its full open position. Thus, airtightness can be maintained when the throttle valve 1 is in the full close position.

Fifth Embodiment

Figure 11:
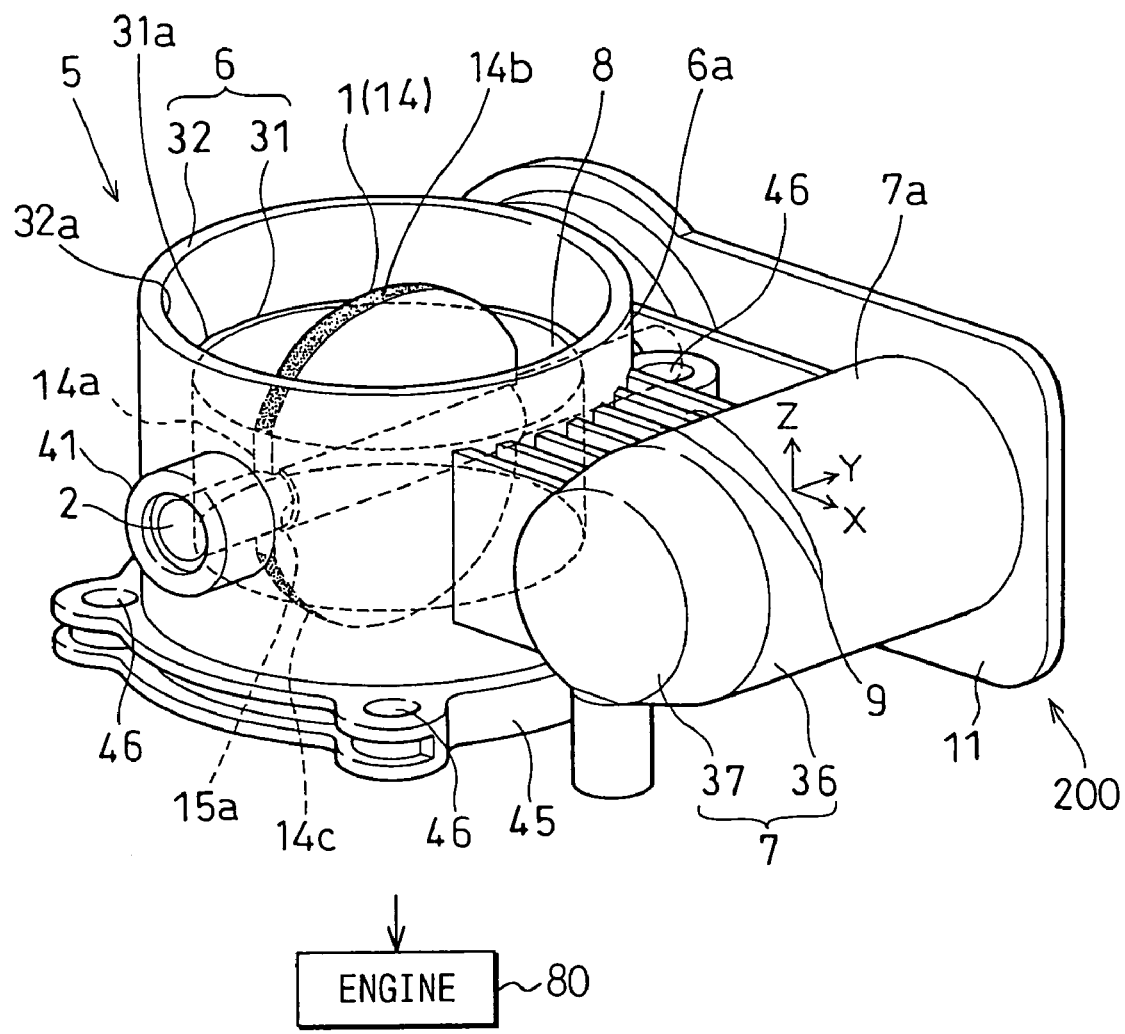
FIG. 11 is a perspective view showing an electrically controlled throttle apparatus according to a fifth embodiment of the present invention.

As shown in FIG. 11 in the fifth embodiment, the outer circumferential periphery 14b on the upper side in FIG. 11, i.e., compressed part shown by a stippled section in FIG. 11 of the molten resinous material (filler) filled in the portion of the cavity (valve cavity) for molding the resinous disc part 14 is compressed in the compression process, similarly to the fourth embodiment. Simultaneously, an outer circumferential periphery 14c on the lower side in FIG. 11, i.e., compressed part of the molten resinous material molded to be the resinous disc part 14 is also compressed using a compression core (not shown) in the compression process. The outer circumferential periphery 14c of the filler on the lower side in FIG. 11 is located on the radially opposite side as the upper stippled section (outer circumferential periphery 14b) in FIG. 11 with respect to the molten resinous material that is molded to be the resinous disc part 14.

In the fifth embodiment, the throttle shaft, i.e., metallic shaft 2 is insert molded in the resinous shaft part 15 of the throttle valve 1 to be arranged in the rotation center direction, i.e., axial direction of the throttle valve 1 shown by Y axis in FIG. 11. Therefore, dispersion of contraction occurring in its molding process can be reduced, similarly to the first to fourth embodiments. Besides, contraction of the throttle valve 1 occurring in a direction shown by Z axis in FIG. 11, which is perpendicular to the axial direction of the throttle shaft 2, can be also restricted, so that dimensional dispersion of the resinous disc part 14 of the throttle valve 1 can be also restricted.

Sixth Embodiment

Figure 12:
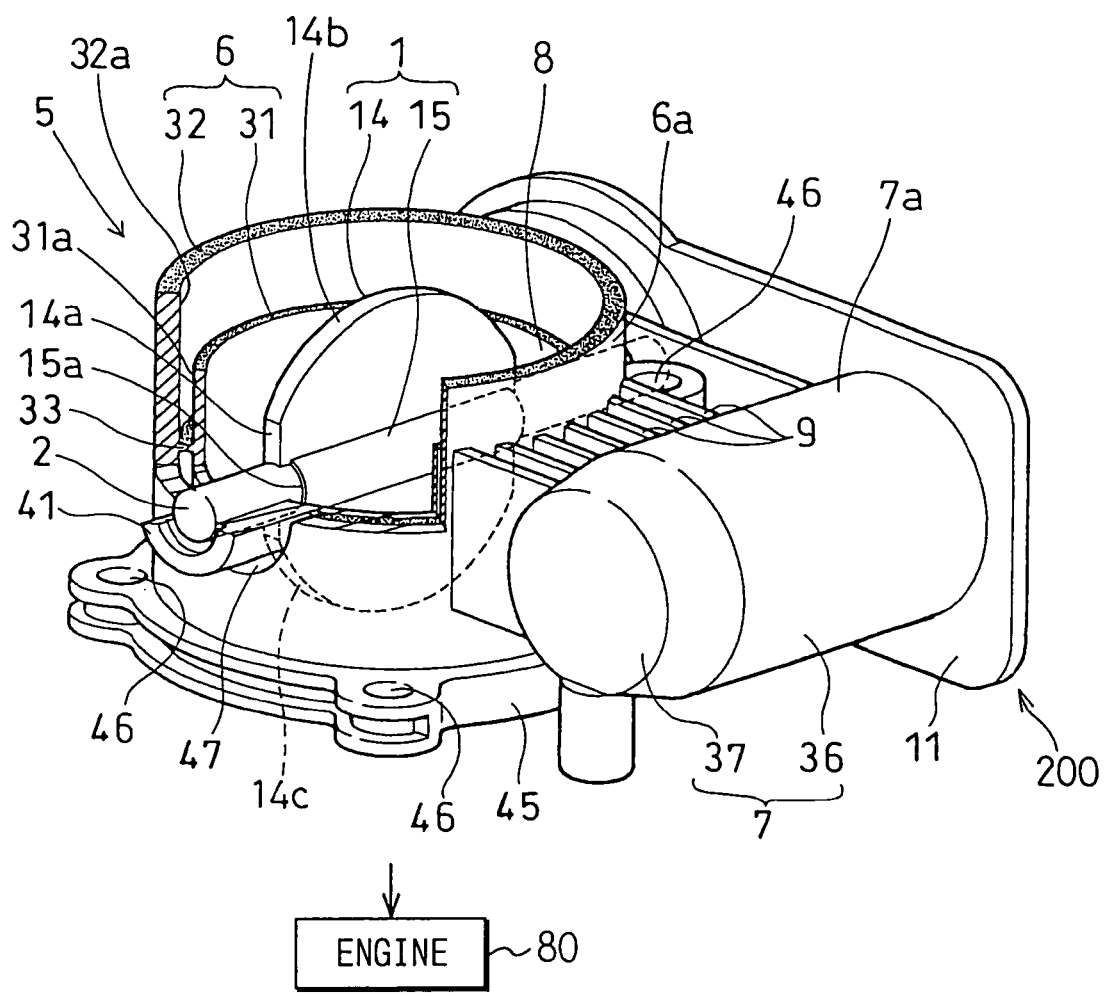
FIG. 12 is a perspective partially cross-sectional view showing an electrically controlled throttle apparatus according to a sixth embodiment of the present invention.

As shown in FIG. 12 in the sixth embodiment, the outer circumferential periphery, i.e., compressed part 14b of the molten resinous material (filler) in the portion of the cavity (valve cavity) for molding the resinous disc part 14 on the upper side in FIG. 12 is compressed in the compression process, similarly to the fourth embodiment. Simultaneously, as shown by stippled sections in FIG. 12, at least one of the annular end faces of the filler in the portion of the cavity (body cavity) for molding the bore inner pipe 31, bore outer pipe 32 and/or annular connecting part 33 of the bore wall part 6 of the throttle body 5 is compressed using a compression core (not shown). Specifically, the annular end faces, i.e., compressed portions of the bore inner pipe 31, bore outer pipe 32 and annular connecting part 33 are located on the upper side in FIG. 12, i.e., on the upstream side of intake airflow.

At least one of the annular end faces of the bore inner pipe 31, bore outer pipe 32 and annular connecting part 33 located on the lower end side in FIG. 12 can be compressed using another compression core (not shown), simultaneously with compressing at least one of the annular end faces, i.e., compressed portions of the bore inner pipe 31, bore outer pipe 32 and annular connecting part 33 located on the upper end side in FIG. 12. Here, the annular end faces on the lower end side in FIG. 12 are located on the downstream side of intake airflow, and located on the opposite side as the annular end faces on the upstream side of intake airflow with respect to the filler molded to be the bore inner pipe 31, bore outer pipe 32 and annular connecting part 33. Therefore, dimensional accuracy of the bore inner periphery 8 of the bore inner pipe 32 of the bore wall part 6 of the throttle body 5 can be enhanced, as well as dimensional accuracy of the throttle valve 1. Thus, dispersion of airtightness performance of the throttle apparatus, when the throttle valve 1 is in its full close position, can be largely restricted compared with the first to fifth embodiments.

Seventh Embodiment

Figure 13:
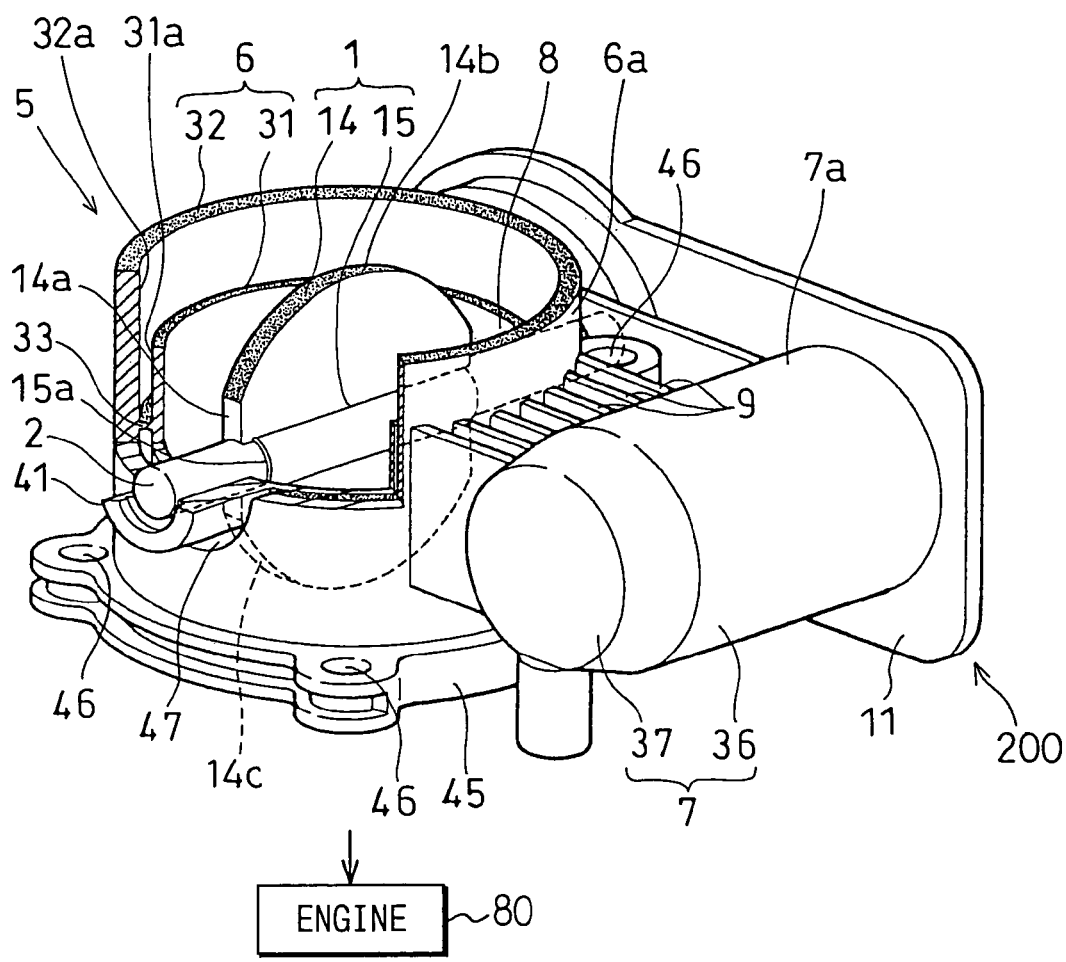
FIG. 13 is a perspective partially cross-sectional view showing an electrically controlled throttle apparatus according to a seventh embodiment of the present invention.
Figure 14A:
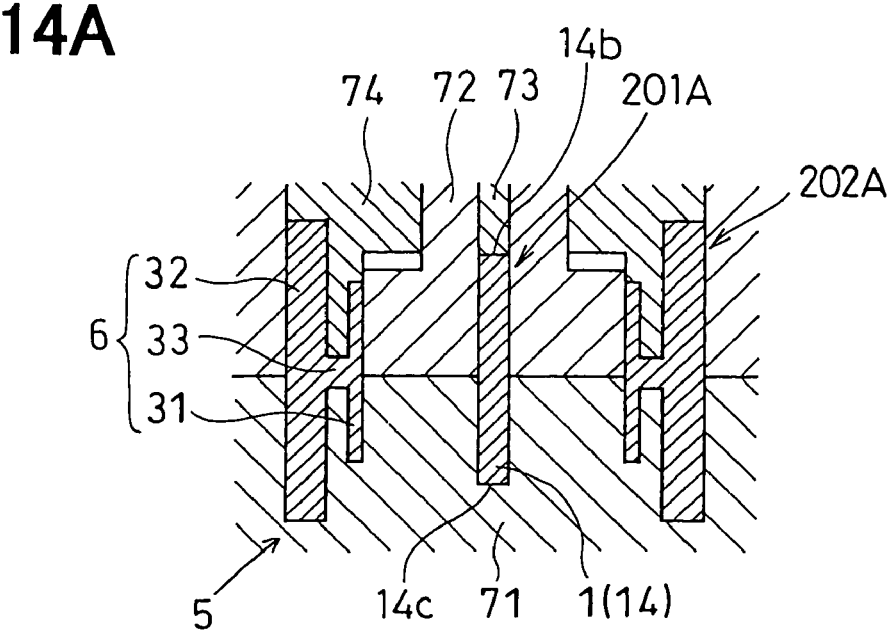
FIG. 14A is a schematic cross-sectional side view showing the first cavity formed in dies in an injection press forming process of the throttle body.
Figure 14B:
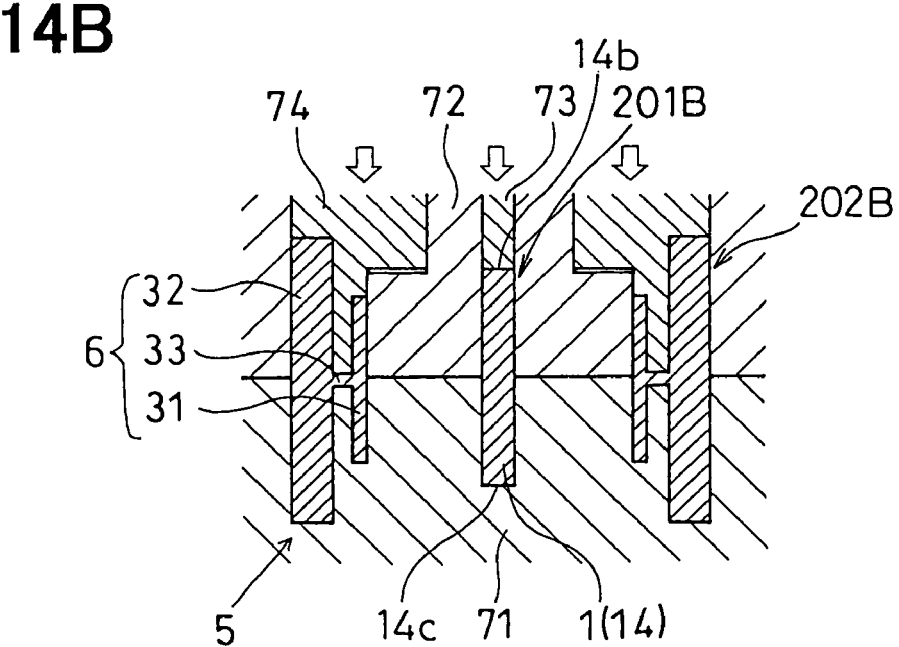
FIG. 14B is a schematic cross-sectional side view showing the second cavity formed in the dies in the injection press forming process of the throttle body according to the seventh embodiment of the present invention.

As shown in FIGS. 13, 14A and 14B in the seventh embodiment, substantially cylindrical shaped compression cores (movable core, slide core, movable die) 73, 74 are received in the movable die 72 to be displaceable with respect to the movable die 72. The shape of the compression core 74 correspond to the cylindrical space of the air intake passage formed in the bore wall part 6 on the upstream side of the intake airflow. The compression cores 73, 74 are displaced with respect to the fixed die 71 by a compression-core driving apparatus (not shown) constructed with a hydraulic cylinder, an air cylinder or the like.

When the compression core (body compression core) 74 is in an initial position, i.e., before compression as shown in FIG. 14A, the first cavity (body cavity) 202A is formed among the fixed die 71, the movable die 72 and the compression core 74. The first cavity 202A has an internal volume greater than at least a total volume of the molded bore inner pipe 31, molded bore outer pipe 32 and the molded annular connecting part 33. When the compression core 74 is displaced to be in a forward position, i.e., after compression as shown in FIG. 14B, the second cavity (body cavity) 202B is formed among the fixed die 71, the movable die 72 and the compression core 74. The second cavity 202B has an internal volume substantially the same as the total volume of the bore inner pipe 31, bore outer pipe 32 and the annular connecting part 33. As shown by a stippled section in FIG. 13, the annular end faces of the filler in the portion of the body cavity 202B for molding the bore inner pipe 31, bore outer pipe 32 and the annular connecting part 33 are compressed by a predetermined compression force.

In this embodiment, a molding process of the throttle body 5 includes a first clamping process and a second clamping process. As shown in FIG. 14A, the compression cores 73, 74 are fixed in the initial position before the compression, and the molding dies are clamped with each other, in the first clamping process that is in the injection-filling process and/or the pressure holding process. In this situation, the axial board thickness of the annular connecting part 33 is set to be equal to or greater than the minimum radial wall thickness of the bore inner pipe 31 and the minimum radial wall thickness of the bore outer pipe 32 that are located around the annular connecting part 33.

Therefore, the axial board thickness of the annular connecting part 33 is set to be large in the first cavity (body cavity) 202A in the injection-filling process and/or the pressure holding process, so that flow resistance of the filler decreases while the filler flows through the first cavity 202A. Thus, the bore inner pipe 31, the bore outer pipe 32 and the motor housing part 7 can be restricted from occurrence of short cut of filler, when a gate is formed in either of the molding dies on one of the sides of the bore inner pipe 31, the bore outer pipe 32 and the motor housing part 7.

Besides, the compression core 74 compresses filler filled in the second cavity (body cavity) 202B formed in the molding dies. Therefore, filler filled in a portion of the second cavity 202B forming the bore wall part 6 is extruded from a cavity 202B forming the sidewall 6a of the bore outer pipe 32 into a cavity (not shown) forming the motor housing part 7 via a cavity (not shown) forming the plural plate-shaped connecting members 9. Therefore, weld, which is apt to be formed in the plural plate-shaped connecting members 9, can be displaced to the side of the motor housing part 7, so that the plural plate-shaped connecting members 9 can be restricted from internal formation of weld. Therefore, a portion (e.g., plate-shaped connecting member 9), which supports both of the motor housing pert 7 receiving the heavy driving motor 3 and the bore outer pipe 32, can be restricted from internal formation of weld. Thus, strength of the throttle body 5 can be maintained.

Filler is filled into the first cavity (body cavity) 202A by an amount equal to or greater than a predetermined volume, e.g., by 80% of the volume of the first cavity 202A. As shown in FIG. 14B, at least one gate is closed (gate cut) and the compression core 74 is slid to a forward position (after compression) in a direction, in which the compression core 74 approaches the fixed die 71 to form the second cavity 202B among the fixed die 71, movable die 72 and the compression core 74 in a compression process that is in the injection-filling process and/or the pressure holding process. Thus, the annular end faces of the bore inner pipe 31, bore outer pipe 32 and the annular connecting part 33 are compressed by the compression core 74 in the second cavity 202B.

At least one of the outer circumferential periphery 14c of the resinous disk part 14, annular end faces of the bore inner pipe 31, the bore outer pipe 32 and the annular connecting part 33, which are located on the downstream side of intake airflow, i.e., on the lower end side in FIG. 14B, can be compressed using another compression core (not shown). Simultaneously, at least one of the outer circumferential periphery 14b of the resinous disk part 14, the annular end faces of the bore inner pipe 31, the bore outer pipe 32 and the annular connecting part 33, which are located on the upper end side in FIG. 14B, i.e., compressed portion on the upstream side of intake airflow, can be compressed using the compression core.

In this situation, the molding dies are clamped with each other and the compression core 74 is slid to the forward position. The axial board thickness of the annular connecting part 33 becomes less than the minimum radial thickness of a portion of the bore inner pipe 31 and the minimum radial thickness of a portion of the bore outer pipe 32, which are located around the annular connecting part 33, in the second clamping process. Preferably, the molding dies are clamped with each other, so that the axial board thickness of the annular connecting part 33 becomes less than the radial wall thickness of the annular connecting part 33 in the second clamping process.

The compression cores 73, 74 can be slid simultaneously, alternatively the compression cores 73, 74 can be slid separately.

Eighth Embodiment

Figure 15:
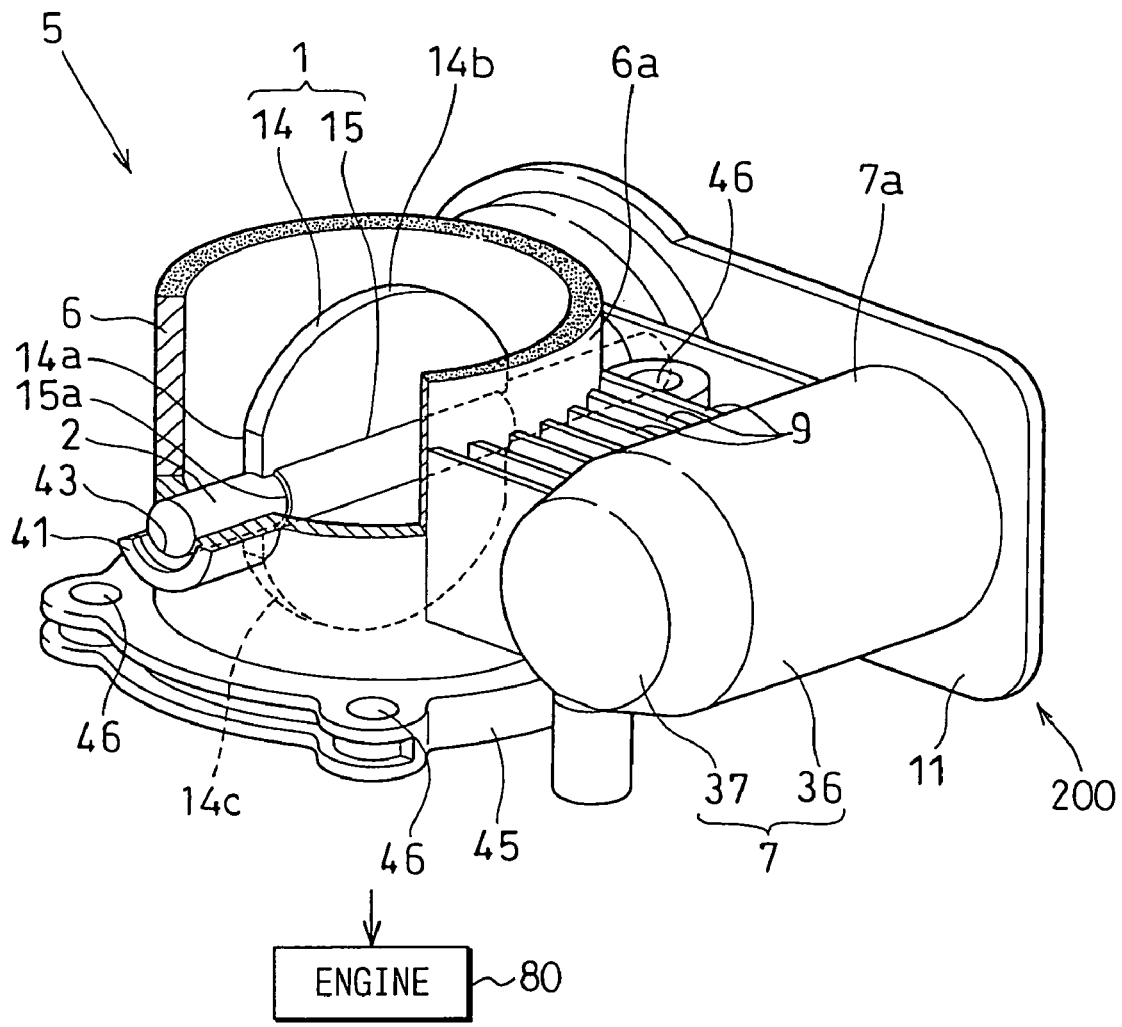
FIG. 15 is a perspective partially cross-sectional view showing an electrically controlled throttle apparatus according to an eighth embodiment of the present invention.
Figure 16:
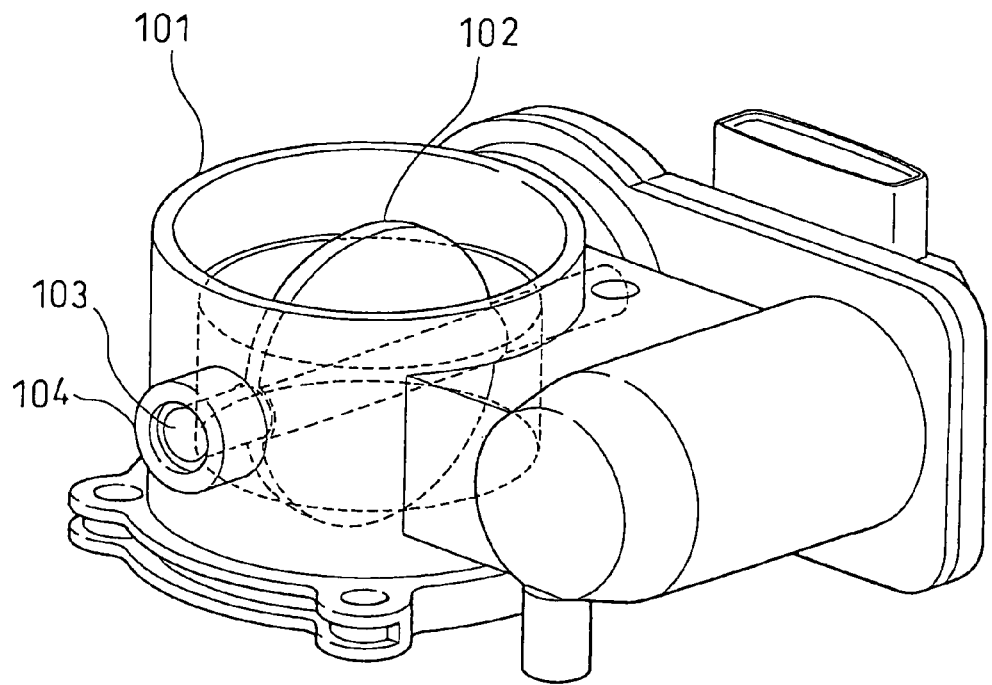
FIG. 16 is a perspective view showing an electrically controlled throttle apparatus according to a prior art.
Figure 17:
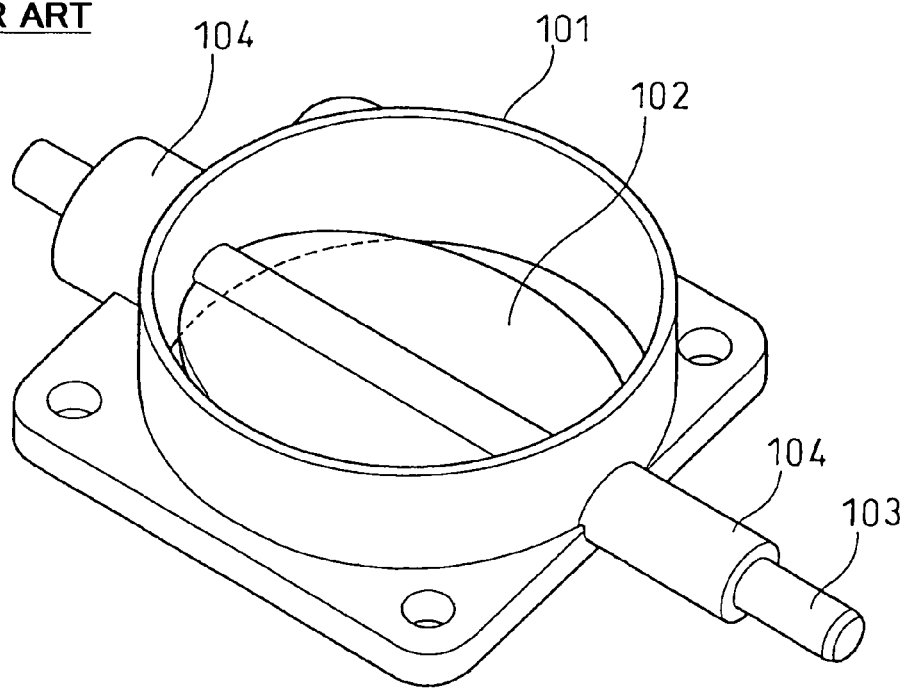
FIG. 17 is a perspective view showing a throttle valve received in a throttle body according to a prior art.
Figure 18:
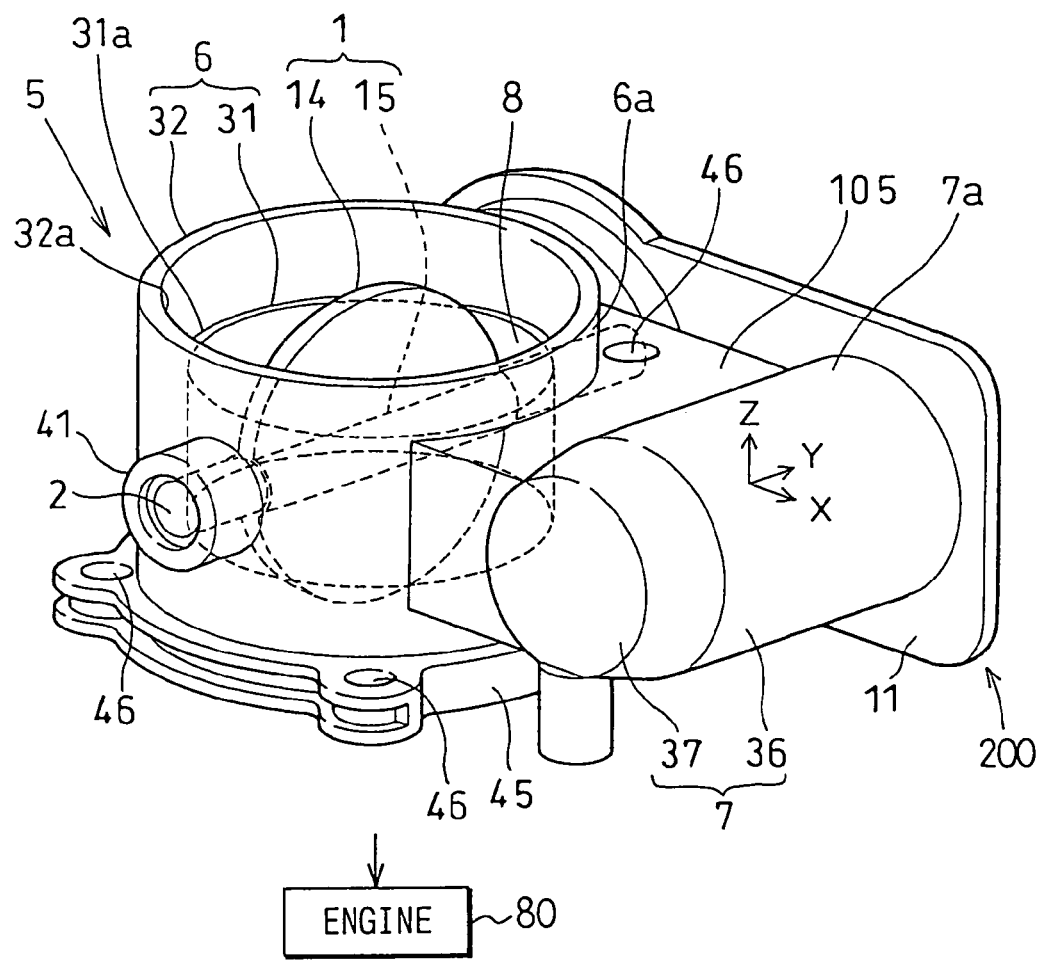
FIG. 18 is a perspective partially cross-sectional view showing an electrically controlled throttle apparatus including a formed throttle body according to an example 1 (related art).

As shown in FIG. 15 in the eighth embodiment, a bore wall part 6 of the throttle body 5 has a single pipe structure. Filler in the cavity for molding the resinous disc part 14 of the throttle valve 1 is compressed at its outer circumferential periphery, i.e., the outer circumferential periphery 14b of the resinous disc part 14 in the compression process. Simultaneously, filler in the cavity for molding the annular end face of the bore wall part 6 located on the upper end side shown by a stippled section in FIG. 15 can be compressed using a compression core (not shown). The annular end face of the bore wall part 6 is a compressed portion located on the upstream side of intake airflow.

The annular end face, i.e., another compressed portion of the bore wall part 6 located on the lower end side in FIG. 15, i.e., on the downstream side of intake airflow can be compressed using another compression core (not shown). In this case, at least one of outer circumferential peripheries 14b, 14c of the resinous disc part 14 on both of the upper and the lower end sides in FIG. 15, and the annular end face of the bore wall part 6 located on the upper end side in FIG. 15 may be compressed simultaneously.

Other Embodiment

A hall IC or a magnetoresistive element or the like can be used as a noncontact sensor, instead of the hall element. A cylindrical-shaped permanent magnet can be used as a magnetic field source, instead of the separated permanent magnets 10. A substantially disc-shaped resinous disc part (disc-shaped part) 14 can construct a throttle valve (resinous valve) 1, and a substantially cylindrical shaped resinous shaft part (cylindrical-shaped part) 15 and a substantially round bar shaped metallic shaft part can construct a throttle shaft 2. A resinous shaft can be used as the throttle shaft 2 instead of the metallic shaft 2 used in the first to fourth embodiments. In this case, the resinous shaft part 15 can be integrally molded of a resinous material to construct the throttle valve 1, so that the number of components of the throttle valve 1 can be reduced.

The above throttle body 5 may be applied to a throttle apparatus, which does not have a driving motor 3, used for an internal combustion engine. In this case, a lever part, which is mechanically connected to an accelerator pedal via a wire cable, is provided instead of the valve gear 13 that is provided on the end of the throttle shaft 2. In this structure, the accelerator position operated by a driver can also be transmitted to the throttle valve 1 and the throttle valve 2.

The outer periphery of the valve supporting portion of the throttle shaft 2 can be knurled partially or entirely. That is, a rough surface can be formed on the outer periphery of the valve supporting portion, so that a sticking characteristic (connecting performance) can be enhanced between the inner periphery of the resinous shaft part 15 of the throttle valve 1 and the outer periphery of the valve supporting portion of the throttle shaft 2. Namely, a serration, notches, grooves or the like are partially or entirely formed on the outer periphery of the valve supporting portion, so that relative displacement are restricted between the throttle valve 1 and the throttle shaft 2 in the axial direction thereof. Thus, the throttle valve 1 can be prevented from being pulled out of the valve supporting portion of the throttle shaft 2. Alternatively, the cross-section of the valve supporting portion of the throttle shaft 2 can be formed in a substantially circular shape having a bolt width. In this structure, the valve supporting portion of the throttle shaft 2 has substantially parallel flat faces along with its axial direction. Alternatively, the cross-section of the resinous shaft part 15 of the throttle valve 1 can be formed in a substantially cylindrical shape having a bolt width. In this structure, resinous shaft part 15 has substantially parallel flat faces along with its axial direction. In this case, relative displacement can be restricted between the throttle valve 1 and the throttle shaft 2 in the rotation direction thereof.

A compression core can be provided inside of the fixed die 71 to be displaceable, such that the compression core can approach the movable die 72, and the compression core can depart from the movable die 72. Alternatively, compression cores can be respectively provided inside of both the fixed die 71 and the movable die 72. In this case, the compression core provided inside of the fixed die 71 is displaceable, such that the compression core can approach the movable die 72, and the compression core can depart from the movable die 72. Besides, the compression core provided inside of the movable die 72 is displaceable, such that the compression core can approach the fixed die 71, and the compression core can depart from the fixed die 71.

Before the throttle valve 1 and the throttle body 5 are simultaneously molded in the same molding dies, mold lubricant (parting agent, release agent) or lubricity agent such as fluorocarbon resin (fluoroplastic) or molybdenum disulfide can be painted on outer peripheral faces of both the first and second bearing sliding part located on both ends of the throttle shaft 2.

The central axis of the bore inner pipe 31 can be eccentrically arranged with respect to the central axis of the bore outer pipe 32 to construct the bore wall part 6 having an eccentric double-pipe structure. That is, the axial center of the bore inner pipe 31 can be eccentrically arranged on an internally one side of the bore outer pipe 32 in the radial direction of the bore outer pipe 32, e.g., vertically lower side of the bore outer pipe 32 in its installation condition. Here, the radial direction of the bore wall part 6 is perpendicular to the axial direction of the bore wall part 6. Alternatively, the axial center of the bore inner pipe 31 can be eccentrically arranged on internally another side of the bore outer pipe 32 in the radial direction of the bore outer pipe 32, e.g., vertically upper side of the bore outer pipe 32 in its installation condition.

The blockade recess parts 34, 35 are formed between the bore inner pipe 31 and the bore outer pipe 32 for blocking moisture or liquid flowing into the bore wall part 6 from both of the upstream and the downstream sides of the throttle valve 1. The blockade recess parts 34, 35 are used to restrict the throttle valve 1 from icing in a cold period such as winter, without additional components, such as an additional piping member for introducing engine-cooling water into the throttle body 5. Alternatively, only the blockade recess part 34 can be provided in the bore wall part 6 for blocking moisture or liquid flowing from the upper side of the throttle valve 1 into the bore wall part 6 along with the inner periphery of the intake pipe. Thus, the number of the parts of the throttle apparatus can be decreased, so that the throttle apparatus can be downsized, and can be produced at a low cost.

A bypass passage can be provided on the outer peripheral side of the bore outer pipe 32 for bypassing the throttle valve 1. Furthermore, an idling speed control valve (ISC valve) can be provided in the bypass passage for controlling idling speed of the engine 80 by adjusting a flow amount of air passing through the bypass passage. An outlet port of blowby gas discharged from a positive crankcase ventilator (PCV) or a purge tube connected to a vapor recovery equipment for recovering vaporized gasoline may be connected to the intake pipe located on the upstream side of intake airflow with respect to the bore wall part 6 of the throttle body 5. In this case, engine oil contained in blowby gas may accumulate to be deposit on the inner wall of the intake pipe. However, in this structure, foreign material such as mist or deposit of blowby gas flowing along with the inner wall of the intake pipe can be blocked by the blockade recess part 34, so that the throttle valve 1 and the throttle shaft 2 can be restricted from occurrence of a failure.

The filler, which is formed to be the throttle body 5 can be a metallic material such as aluminum alloy or magnesium alloy.

The throttle body 5 and the throttle valve 1 can be integrally formed by resin molding or metal casting.

The filler can be simultaneously injected from plural gates into the cavity of the dies while the dies are clamped with each other in the filling process and/or the pressure holding process. Alternatively, the filler can be injected from the plural gates into the cavity of the dies by plural times while the dies are clamped with each other in the filling process and/or the pressure holding process.

Various modifications and alternations may be made to the above embodiments without departing from the spirit of the present invention.

What is claimed is:

1. A substantially simultaneous forming method of a throttle apparatus, which is provided in an internal combustion engine, using same dies, the throttle apparatus including a substantially tubular throttle body and a substantially disc-shaped throttle valve having a rotation center substantially perpendicular to a central axis of the throttle body, the forming method of the throttle apparatus comprising:

filling a filler, which is heated to be in a molten state, into a cavity of the dies to form the throttle body and the throttle valve, such that the throttle body rotatably receives the throttle valve that is rotated by a predetermined angle with respect to a full close position of the throttle valve in a filling process; and compressing the filler in the cavity of the dies in a direction of the central axis of the throttle body by a predetermined pressure in a compressing process, wherein the throttle valve is rotated by the predetermined angle with respect to the full close position of the throttle valve in the filling process such that the predetermined angle substantially corresponds to a full open position of the throttle valve, and the throttle valve includes a disc-shaped part having at least one of a groove, a substantially flat section and a substantially linear section, which is located in an axially end portion of the outer circumferential periphery of the disc-shaped part to be parallel to the central axis of the throttle body, to form a gap between said axial end portion of the outer circumferential periphery of the disc-shaped part and an inner periphery of said tubular throttle body.

2. A forming method of a throttle apparatus according to claim 1, further comprising:

holding a predetermined pressure applied to the filler in the cavity of the dies in a pressure holding process after the filling process;

cooling the filler, to which the predetermined pressure is applied in the cavity of the dies, in the pressure holding process; and refilling a filler in a molten state into the cavity of the dies by an amount, which is equivalent to a reduced volume of the cooled filler contracted by the cooling, in the pressure holding process.

3. A forming method of a throttle apparatus according to claim 2, wherein the compressing process is included in at least one of the filling process and the pressure holding process.

4. A forming method of a throttle apparatus according to claim 1, wherein the throttle valve further includes a cylindrical part molded of resinous material and integrated with the disc-shaped part, the cylindrical part includes one of a substantially axial reinforce member and a metallic shaft that is insert molded in the cylindrical part.

5. A forming method of a throttle apparatus according to claim 4, wherein the cavity includes a valve cavity defining an outer circumferential periphery of the disc-shaped part located on an end side in a radial direction of the disc-shaped part, the radial direction of the disc-shaped part is substantially perpendicular to the rotation center of the disc-shaped part of the throttle valve, and the dies include a valve compression core that compresses the filler, which is filled in the valve cavity by a predetermined volume less than an internal volume of the valve cavity, in the radial direction of the disc-shaped part.

6. A forming method of a throttle apparatus according to claim 1, wherein a filler, which is formed to be an outer circumferential periphery of the throttle valve, is compressed in the cavity of the dies in the compressing process, the outer circumferential periphery of the throttle valve compressed in the cavity of the dies is located on an end side in a radial direction of the throttle valve, and the radial direction of the throttle valve is substantially perpendicular to the rotation center of the throttle valve.

7. A forming method of a throttle apparatus according to claim 1, wherein a gap defined between the throttle valve and the throttle body becomes minimum when the throttle valve is in the full close position of the throttle valve.

8. A forming method of a throttle apparatus according to claim 1, wherein intake air introduced into the internal combustion engine flows through the throttle body along the central axis of the throttle body.

9. A forming method of a throttle apparatus according to claim 1, wherein the throttle valve is rotated by the predetermined angle with respect to the full close position of the throttle valve in the filling process, such that a portion of the radially outer circumferential periphery of the throttle valve, which substantially perpendicularly crosses a rotation center of the throttle valve, becomes substantially parallel to the central axis of the throttle body.

10. A forming method of a throttle apparatus according to claim 1, wherein the throttle body has a substantially cylindrical bore wall part, which is integrally molded of a resinous material, that rotatably receives the throttle valve, the cavity includes a body cavity that defines the bore wall part of the throttle body, and the dies include a body compression core that compresses the filler, which is filled in the body cavity by a predetermined volume less than an internal volume of the body cavity, in a direction substantially parallel to the central axis of the bore wall part of the throttle body.

11. A forming method of a throttle apparatus according to claim 1, wherein the throttle body has a substantially cylindrical bore wall part that is integrally formed with the throttle body, the throttle valve has a disc-shaped part and a cylindrical part that are integrally formed with the throttle valve, one of thermo plastic, aluminum alloy and magnesium alloy, which is heated to be in a molten state, is the filler filled in the cavity of the dies, and the filler filled in the cavity is cooled to be solidified in order to form the throttle valve and the bore wall part of the throttle body that rotatably receives the throttle valve.

12. A forming method of a throttle apparatus according to claim 1, wherein the throttle body and the throttle valve are integrally formed using one of resin molding and metal casting.

13. A substantially simultaneous forming method of a throttle apparatus, which is provided in an internal combustion engine, using same dies, the throttle apparatus including a substantially tubular throttle body and a substantially disc-shaped throttle valve having a rotation center substantially perpendicular to a central axis of the throttle body, the forming method of the throttle apparatus comprising:

filling a filler, which is heated to be in a molten state, into a cavity of the dies to form the throttle body and the throttle valve, such that the throttle body rotatably receives the throttle valve that is rotated by a predetermined angle with respect to a full close position of the throttle valve in a filling process; and compressing the filler in the cavity of the dies in a direction of the central axis of the throttle body by a predetermined pressure in a compressing process, wherein the throttle body has a bore wall part having a double-pipe structure including a substantially cylindrical inner pipe that rotatably receives the throttle valve, a substantially cylindrical outer pipe that is arranged on a radially outer side of the inner pipe to define a cylindrical space with an outer periphery of the inner pipe, and an annular connecting part that connects an outer periphery of the inner pipe and an inner periphery of the outer pipe, the annular connecting part blocks substantially entirely over a circumferential area of the cylindrical space defined between the bore inner pipe and the bore outer pipe, the inner pipe, the outer pipe and the annular connecting part are integrally molded of a resinous material, the cavity includes a body cavity that defines at least one of the inner pipe, outer pipe and the annular connecting part of the bore wall part of the throttle body, and the dies include a body compression core that compresses the filler, which is filled in the body cavity by a predetermined volume that is less than an internal volume of the body cavity, in a direction substantially parallel to the central axis of the bore wall part of the throttle valve.

14. A forming method of a throttle apparatus according to claim 13, wherein the annular connecting part has an axial thickness that is less than a minimum thickness of the inner pipe in a radial direction thereof and a minimum thickness of the outer pipe in a radial direction thereof.

15. A forming method of a throttle apparatus according to claim 14, wherein the bore wall part has a substantially cylindrical valve bearing that is integrally molded of a resinous material to rotatably support an end side of the rotation center of the throttle valve, and the valve bearing is connected to an internal periphery of the outer pipe via the inner pipe and the annular connecting part.

16. A forming method of a throttle apparatus according to claim 15, wherein the valve bearing protrudes from the outer periphery of the inner pipe in a direction substantially parallel to the rotation center of the throttle valve, and the bore wall part defines a substantially annular recess that is located around the valve bearing to define an annular space between the outer pipe and the valve bearing.

17. A forming method of a throttle apparatus according to claim 13, wherein one of the bore wall part and the outer pipe has a sidewall, to which a motor housing part is integrally molded of a resinous material, and the motor housing part receives a motor that rotates the throttle valve.

18. A forming method of a throttle apparatus according to claim 17, wherein the throttle body has a plurality of plate-shaped connecting members that connect a sidewall face of the bore wall part and a sidewall face of the motor housing part with each other, and the bore wall part, motor housing part and the connecting members are integrally molded of a resinous material.

19. A forming method of a throttle apparatus according to claim 17, wherein the motor housing part has a substantially cylindrical shape.

20. A forming method of a throttle apparatus according to claim 13, wherein the annular connecting part has an axial thickness that is less than a radial thickness of the annular connecting part.

21. A forming method of a throttle apparatus according to claim 13, wherein the inner pipe of the bore wall part has a substantially cylindrical inner periphery that defines an intake air passage through which intake air passes, and the throttle valve opens and closes the intake air passage defined by the inner periphery of the inner pipe of the bore wall part.

22. A forming method of a throttle apparatus according to claim 13, wherein the axial thickness of the annular connecting part is less than the minimum thickness of a portion of the outer pipe, which is located in the vicinity of the annular connecting part, in the radial direction thereof, and the axial thickness of the annular connecting part is less than the minimum thickness of a portion of the inner pipe, which is located in the vicinity of the annular connecting part, in the radial direction thereof.

23. A substantially simultaneously forming method of a throttle apparatus, which is provided in an internal combustion engine, using same dies, the throttle apparatus including a substantially tubular throttle body and a substantially disc-shaped throttle valve having a rotation center substantially perpendicular to a central axis of the throttle body, the forming method of the throttle apparatus comprising:

filling a filler, which is heated to be in a molten state, into a cavity of the dies to form the throttle body and the throttle valve, such that the throttle body rotatably receives the throttle valve that is rotated by a predetermined angle with respect to a full close position of the throttle valve in a filling process; and compressing the filler in the cavity of the dies in a direction of the central axis of the throttle body by a predetermined pressure in a compressing process, wherein the throttle body has a bore wall part having a double-pipe structure including a substantially cylindrical inner pipe that rotatably receives the throttle valve, a substantially cylindrical outer pipe that is arranged on a radially outer side of the inner pipe to define a cylindrical space with an outer periphery of the inner pipe, and an annular connecting part that connects an outer periphery of the inner pipe and an inner periphery of the outer pipe, the annular connecting part blocks substantially entirely over a circumferential area of the cylindrical space defined between the bore inner pipe and the bore outer pipe, the throttle body, the bore wall part, the inner pipe, the outer pipe and the annular connecting part are integrally formed, the throttle valve has a disc-shaped part and a cylindrical part that are integrally formed with the throttle valve, one of thermo plastic, aluminum alloy and magnesium alloy, which is heated to be in a molten state, is the filler filled in the cavity of the dies, and the filler filled in the cavity is cooled to be solidified in order to form the throttle valve and the inner pipe of the bore wall part of the throttle body that rotatably receives the throttle valve.

* * * * *